(12) United States Patent
Balinsky

(10) Patent No.: US 7,747,947 B2
(45) Date of Patent: Jun. 29, 2010

(54) DOCUMENT CREATION SYSTEM AND RELATED METHODS

(75) Inventor: Helen Balinsky, Wales (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1330 days.

(21) Appl. No.: 11/190,266

(22) Filed: Jul. 27, 2005

(65) Prior Publication Data

US 2006/0026515 A1    Feb. 2, 2006

(51) Int. Cl.
*G06F 7/00* (2006.01)
*G06F 7/14* (2006.01)

(52) U.S. Cl. ................ 715/243; 715/249; 715/246; 715/247; 715/251

(58) Field of Classification Search ............. 715/243, 715/249, 247, 246, 251
See application file for complete search history.

(56) References Cited

U.S. PATENT DOCUMENTS

| | | | | |
|---|---|---|---|---|
| 5,335,290 A | * | 8/1994 | Cullen et al. ............... | 382/176 |
| 5,887,133 A | * | 3/1999 | Brown et al. ............... | 709/200 |
| 5,956,737 A | * | 9/1999 | King et al. .................. | 715/202 |
| 5,956,738 A | | 9/1999 | Shirakawa | |
| 6,380,954 B1 | | 4/2002 | Gunther | |
| 6,415,306 B2 | | 7/2002 | Seaman | |
| 7,010,746 B2 | * | 3/2006 | Purvis ......................... | 715/249 |
| 7,133,050 B2 | * | 11/2006 | Schowtka .................. | 345/620 |
| 7,171,617 B2 | * | 1/2007 | Harrington et al. .......... | 715/255 |

FOREIGN PATENT DOCUMENTS

| | | |
|---|---|---|
| EP | 1503336 A2 | 2/2005 |
| GB | 2378340 A | 2/2003 |
| GB | 2 416 613 A | 2/2006 |
| WO | WO 98/10356 | 3/1998 |
| WO | WO 01/39019 A2 | 5/2001 |
| WO | WO 02/37939 A2 | 5/2002 |
| WO | WO 02/084582 A2 | 10/2002 |

OTHER PUBLICATIONS

GB Examination Report mailed Nov. 24, 2009 (3 pages).

* cited by examiner

*Primary Examiner*—Stephen S Hong
*Assistant Examiner*—Wilson Tsui

(57) ABSTRACT

Systems and methods for creating a document having an allocated area in which information is placed are disclosed. Embodiments include providing a set of content-items which contain information to be displayed in the allocated area, and each having a one or more sides; selecting two content-items to be combined; combining the two selected content-items by a side of common length to reduce the number of content-items in the set by one; repeating steps ii. and iii. until one content-item remains that is a composition of the set of content-items; and causing the created document to be printed.

17 Claims, 17 Drawing Sheets

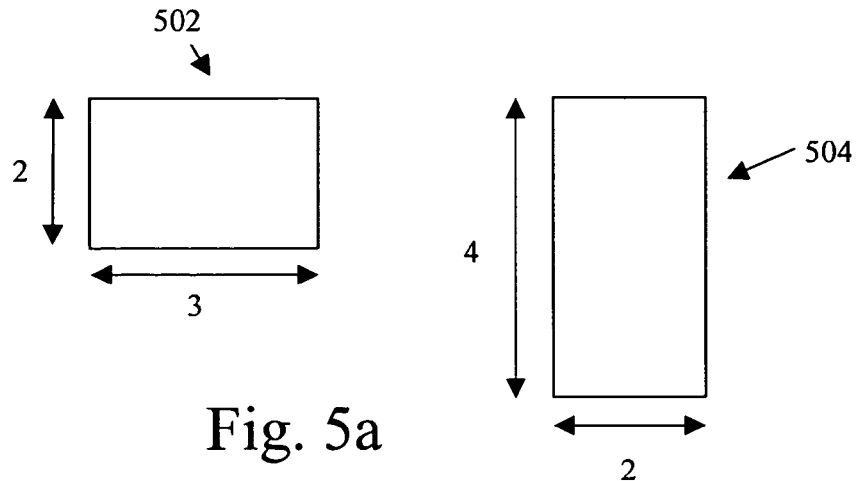
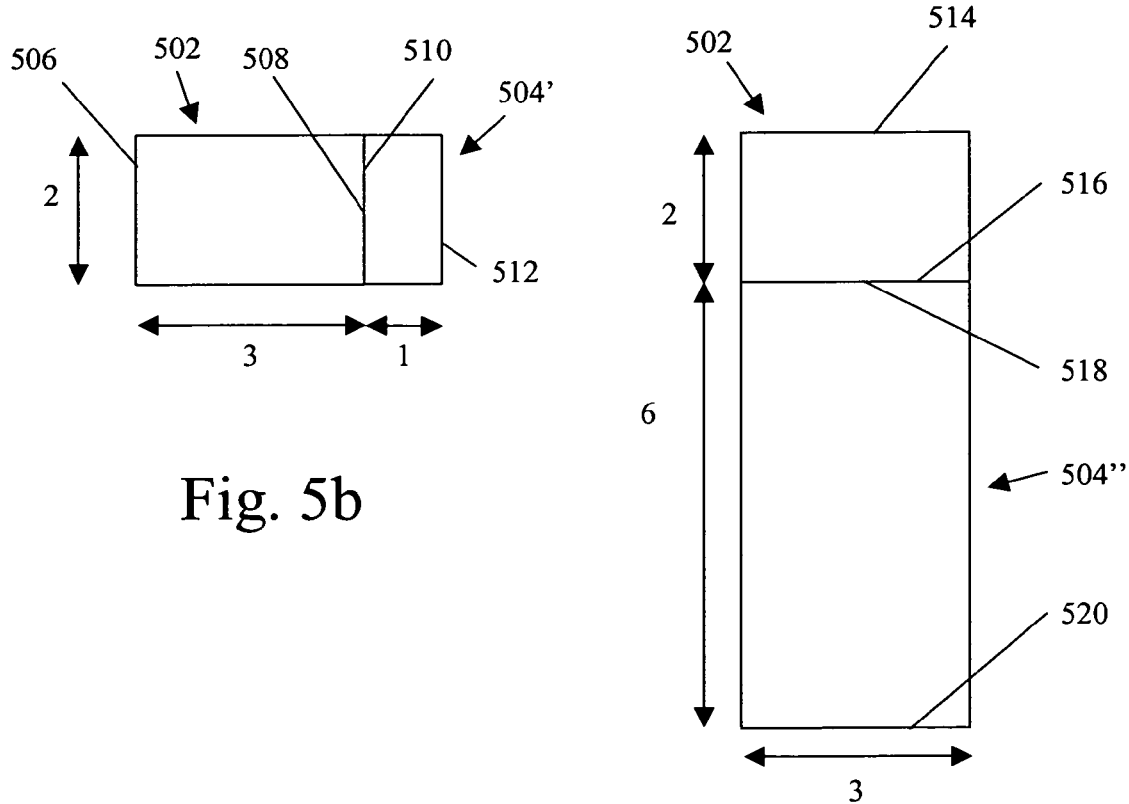

DOCUMENT CREATION SYSTEM AND RELATED METHODS

This application claims priority to United Kingdom Application No. 0501888.2, filed Jan. 31, 2005, entitled "Document Creation System and Related Methods," and United Kingdom Application No. 0416641.9, filed Jul. 27, 2004, entitled "A Method of packing Objects Into A Specified Area."

This invention relates to a document creation system and related methods. In particular, but not exclusively, the invention relates to customisation of printed documents.

It will be appreciated that a personalised item of sales literature, for example a brochure or an advertising flyer, is likely to result in more sales per literature item than an item of sales literature that is sent en masse to many customers. An item of sales literature that is produced for the general public will undoubtedly include information that is not of interest to all customers that receive the literature and each customer will have to look through the literature to find the parts that are of interest to them. Personalising an item of sales literature can include selecting specific content-items for a specific customer, and placing these in certain areas of a brochure or flyer in an aesthetically pleasing way.

With the advent of databases holding information about customers', clients', etc. (hereinafter referred to as customer) preferences, purchases, past actions, and the like, it has become possible to generate targeted communications that are targeted specifically to a particular customer based upon the data held in the database. Such databases may be exemplified by so-called supermarket loyalty schemes. However, the skilled person will appreciate that such schemes are only one such example.

It will be appreciated that such databases may comprise many thousands (and even tens or hundreds of thousands) of customers. It would be impossible to check, manually, that targeted communications sent to such a number of people conform to accepted presentation rules within reasonable time scales. As such the process should be advantageously performed automatically.

Known systems for automatically packing content-items into an allocated area aim to minimize the total area taken up by the content-items. This approach is not relevant for publishing where aesthetic appeal is a priority, and a number of design rules should be considered.

Other known systems for packing content-items into an allocated area select content-items that are to be placed next to each other using random searches based on analogies to other processes, for example simulated annealing.

Alternatively, personalised items of sales literature can be prepared by a skilled designer. However, for a designer to produce a personalised item of sales literature for each customer increases the costs associated with the literature as well as the time required to produce it.

A professional designer of such literature can take into account a number of design 'rules' in order that each item of sales literature is well presented and appears attractive and interesting to the customer in order to gain their attention. The designer can also consider personal preferences of the customer, and/or of the company producing the literature, to further tailor the item of sales literature to specific needs.

Such design 'rules' that are considered to make a document aesthetically pleasing may include:
not allowing content-items to overlap;
having no blank, unfilled holes within the layout;
having regular boundaries between content-items within the document;
ensuring that edges of content-items within a page are aligned in order to reduce the visual complexity of the page;
the aesthetic principle of page density, which requires that a certain amount of empty unoccupied space is present on a page to act as a "rest area" for the eye.
ensuring that content-items within the document are balanced, and that no content-items are disproportionately enlarged or diminished, and
considering the proportions, balance in colour, spread of focus points, choice of colour and other physical properties of content-items.

It is advantageous that an item of sales literature is produced professionally and adheres to at least some design rules, as an untidy looking item of sales literature can dissuade a customer from using the company that produces the literature. Readers of such sales literature are exposed to a large number of professionally published materials and consequently, have strong expectations of high quality documents. Thus, readers generally have an expectation that any communications they receive will be of a high quality.

Items of sales literature can also have significant time constraints associated with them, for example when producing a catalogue for Christmas, and it would be impossible for a professional designer to produce a number of personalised items of sales literature in the necessary timeframe.

According to a first aspect of the present invention, there is provided a method of creating a document having an allocated area in which information is placed, the method comprising:
i. providing a set of content-items which contain information to be displayed in the allocated area, and each having a one or more sides;
ii. selecting two content-items to be combined;
iii. combining the two selected content-items to reduce the number of content-items in the set by one;
iv. repeating steps ii. and iii. until one content-item remains that is a composition of the set of content-items; and
i. causing a printing means to print the created document.

According to a second aspect of the present invention, there is provided a document creation system arranged to create a document from displayable information, the system comprising content-item supply means arranged to provide a set of content-items containing displayable information for placement in an allocated area of the document, selection means arranged to select two content-items to be combined from the set of content-items, combination means arranged to combine the selected content-items to form a new content-item and therefore reduce the number of content-items in the set by one, checking means arranged to check whether all content-items have been combined, and if not all of the set of content-items have been combined the system selects and combines further content-items until one composition of all of the set of content-items remains.

According to a third aspect of the present invention, there is provided a program arranged to cause a computer to create a document from displayable information accessible thereby, the program being arranged to cause the computer to access a supply of content-items containing displayable information to obtain a set of content-items, to select two content-items to be combined, to combine the two selected content-items, to continue combining content-items until one content-item remains that is a composition of the content-items within the set and subsequently to cause the computer to create the document having the composition of content-items as a region of displayable information thereon.

According to a fourth aspect of the present invention, there is provided a machine readable medium containing instructions which when read by a machine cause that machine to provide the method of the first aspect of the invention.

According to a fifth aspect of the present invention, there is provided a machine readable medium containing instructions which when read by a computer cause that computer to provide the system of the second aspect of the invention.

According to a sixth aspect of the present invention, there is provided a machine readable medium containing instructions which provide the program of the third aspect of the invention.

According to a seventh aspect of the invention there is provided a method of creating a document having an allocated area of aspect ratio R by placing a group of content-items within the allocated area, the method comprising:
  i. determining whether the aspect ratio of the group is equal to the aspect ratio R of the allocated area;
  ii. if the aspect ratio of the group is not equal to the aspect ratio R then cropping one or more of the content-items; and
  iii. repeating steps i. and ii. until the aspect ratio of the group equals the aspect ratio R; and
  iv. causing a printing means to print the created document.

A desired aspect ratio can be achieved in one step, then we can verify other aesthetical properties. It can, for example, be the case that the desired aspect ratio is out of reach, then the group is rejected and the alternative group is formed.

The method may group a plurality of content-items into the group in a step prior to step i.

Conveniently, step i of the method includes a step of determining whether it is possible for the aspect ratio of the group to be made equal to the aspect ratio R.

In some embodiments a further content-item may be added to the group of content-items if it is determined that the aspect ratio of the group cannot be made equal to R. Such a method may make it possible to for the group to be made to have the desired aspect ratio.

Preferably, content-items within the group of content-items have associated therewith a region of interest that should remain in the content-item and in which cropping of any content-item ensures that none of the region of interest is removed.

The region of interest may be pre-calculated (or can be drawn by user) for each content-item and stored such that it can be accessed in order to crop that content-item.

According to an eighth aspect of the invention there is provided a document creation system arranged to create a document having an allocated area of aspect ratio R by placing a group of content-items in the allocated area, the system comprising a checking means arranged to determine the aspect ratio of the group of content-items and adjustment means arranged to crop one or more of the content-items if it is determined by the adjustment means that the aspect ratio of the group is not equal to R.

The system may comprise a content-supply means arranged to provide a plurality of content-items and a grouping means arranged to group the plurality of content-items to form the group to be placed in the allocated area.

Conveniently, the system comprises an adjustment means arranged to crop content-items such that a region of interest within the content-item remains within the content-item.

The checking means may be arranged to assess whether the aspect-ratio of the group can be made to equal (with the required level of accuracy) the aspect-ratio R.

Conveniently, the system is arranged to add a further content-item, drop an optional item or rearrange to the group if the checking means determines that the aspect-ratio of the group cannot be made to equal R.

According to a ninth aspect of the invention there is provided a document creation program arranged to create a document having an allocated area of aspect-ratio R in which the program places information provided by a plurality of content-items within the allocated area, the program comprising instructions to:
  i. assess the grouped content items and determining whether the aspect-ratio of the group is equal to the aspect-ratio R of the allocated area; and
  ii. crop one or more of the content-items if the aspect-ratio of the group is not equal to the aspect-ratio R.

According to a tenth aspect of the invention there is provided a machine readable medium containing instructions which when read by a machine cause that machine to provide the method of the seventh aspect of the invention.

According to an eleventh aspect of the invention there is provided a machine readable medium containing instructions which when read by a computer cause that computer to provide the system of the eighth aspect of the invention.

According to a twelfth aspect of the invention there is provided a machine readable medium containing instructions which provide the program of the ninth aspect of the invention.

The machine readable medium of the fourth, fifth or sixth aspects of the invention may be any one- or more of the following: a floppy disk; a CDROM/RAM; a DVD ROM/RAM (including +R/RW, -R/RW); any form of magneto optical disk; a hard drive; a memory; a transmitted signal (including an internet download, file transfer, or the like); a wire; or any other form of medium.

The skilled person will appreciate that any of the features discussed in relation to any of the above aspects of the invention may equally be applied to any of the other aspects of the invention.

An embodiment of the present invention is now described, by way of example only and with reference to the accompanying figures of which:

FIG. 5 shows how two content-items can be adjoined according to an embodiment of the present invention;

Figure 13A:
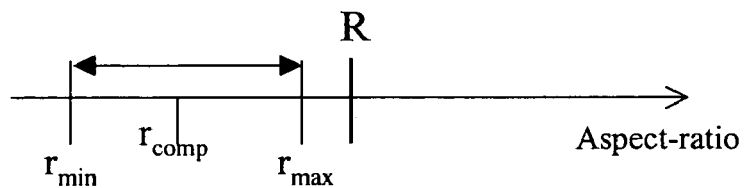
Figure 13B:
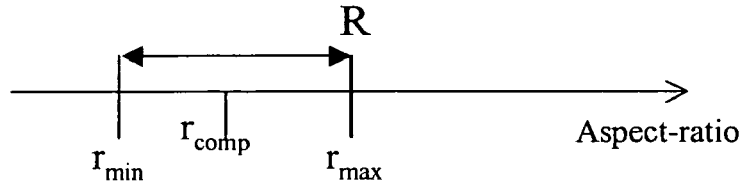
Figure 13C:
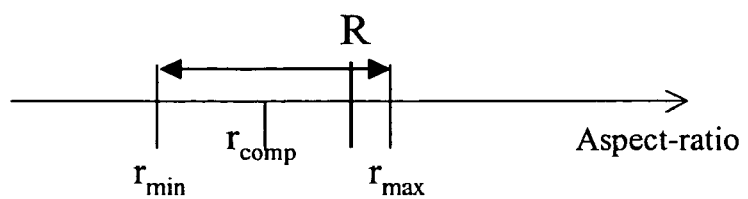
Figure 14:
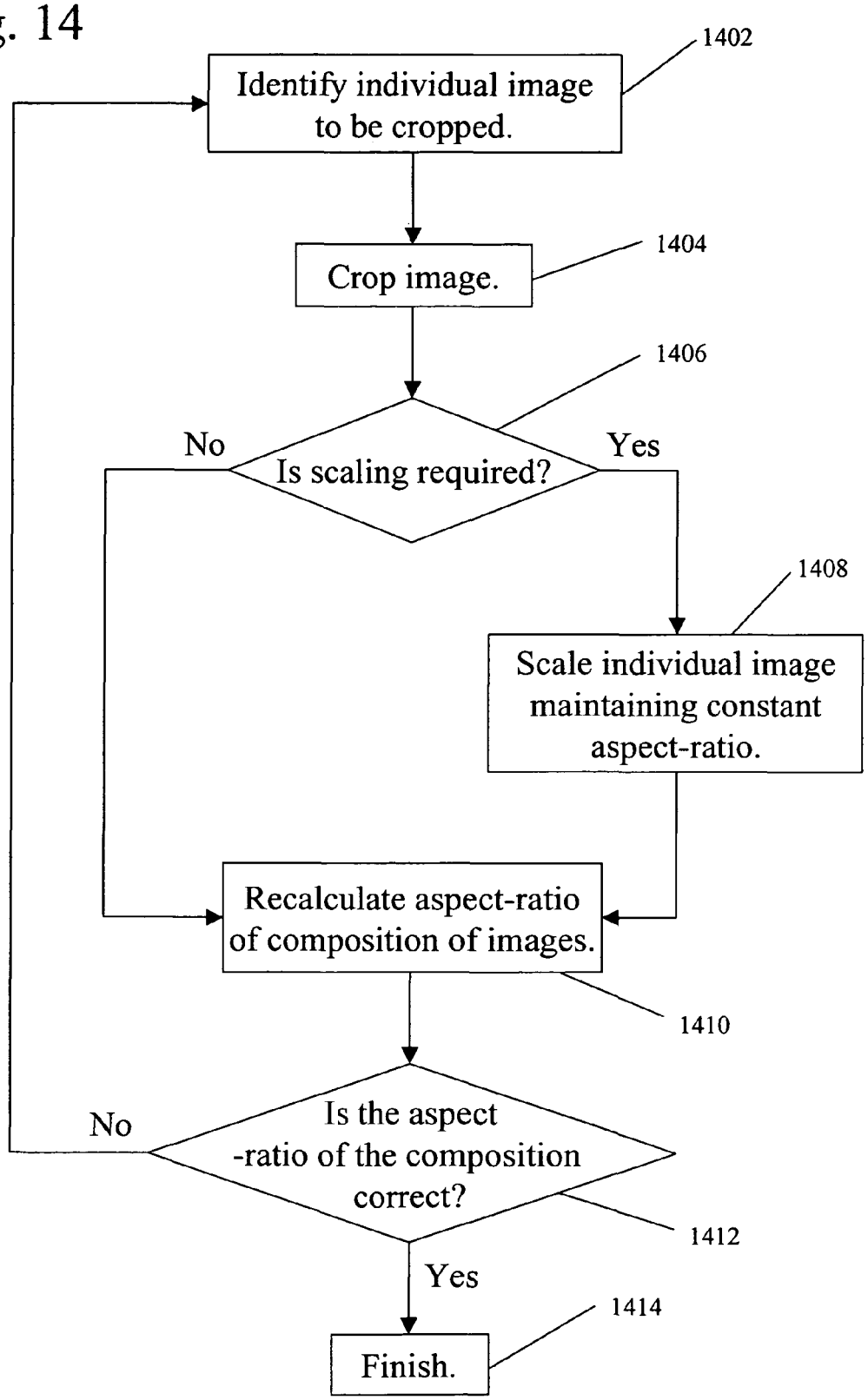

FIG. 13 shows schematically line diagrams indicating a target overall aspect-ratio and the limits of the aspect-ratio of a composition of content-items according to an embodiment of the present invention; and FIG. 14 shows a flowchart outlining the steps performed when cropping an individual image in order to change the aspect-ratio of a composition of images according to an embodiment of the present invention.

Figure 15:
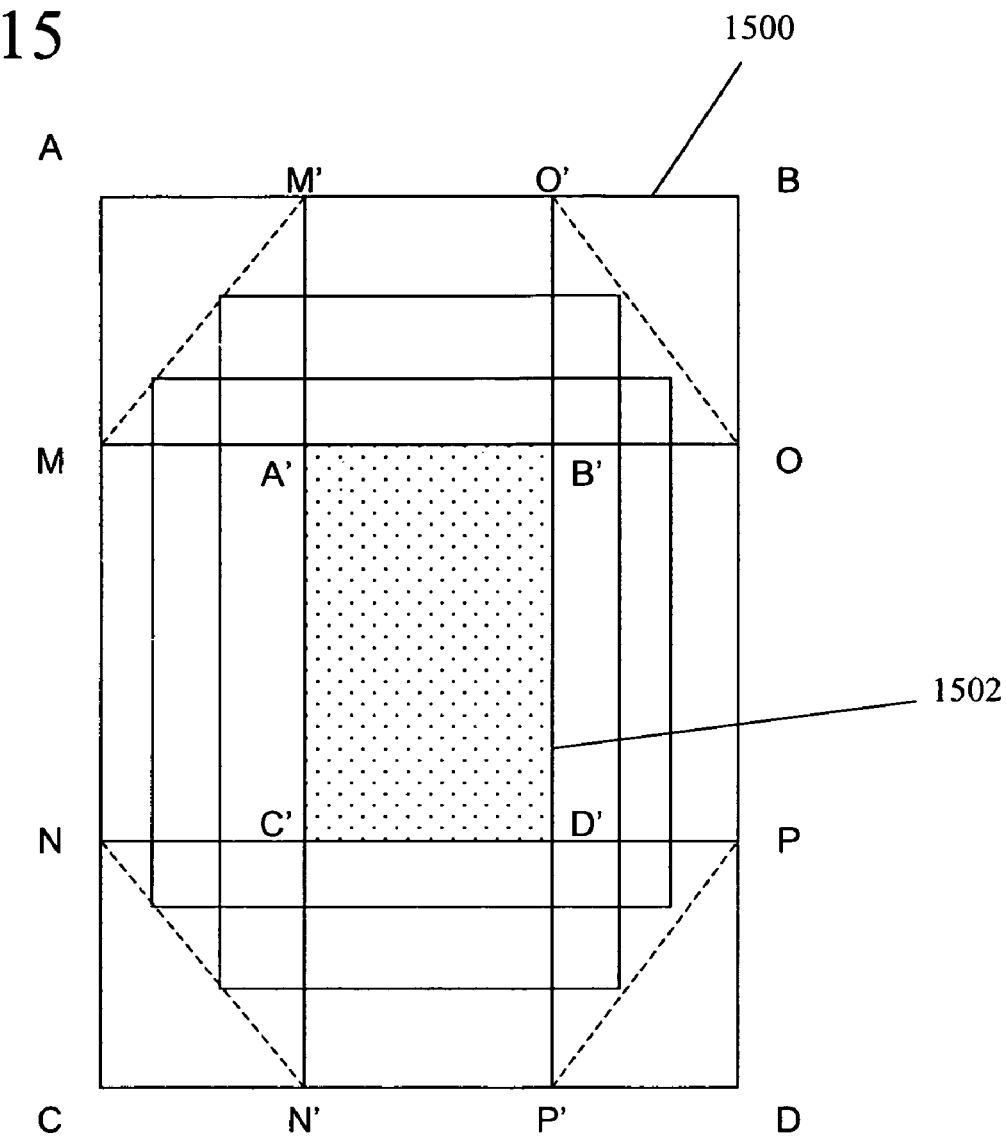

FIG. 15 shows a content-item defined by points ABCD according to an embodiment of the present invention.

Embodiments of this invention may be used to automatically layout content-items in communications, which are generally, but not exclusively, items of sales literature comprising printed documents having a displayable area. For conciseness this method will hereinafter be described in relation to the creation of printed documents although it has wider applicability. The method may for example be applied to electronic documents such as emails, web pages, Adobe PDF files and the like.

Generally, the documents will be stored in an electronic form in an electronic memory. For simplicity, content-items and allocated areas of documents to be packed with content-items are considered as rectangles in the following examples. It will be appreciated that content-items can take any other shape that is suitable for being packed into an allocated area of a correspondingly suitable shape.

It may be possible that content-items are combined along common-edges which are not equal in length, whether or not the content-items were rectangular in shape. For example, if it were allowable for two rectangular content-items to be combined into a so-called 'L' shape content item it will be apparent that one of the content-items would not be joined to the other along the entirety of the edges thereof used to join them.

A portion of the displayable area may be allocated (an allocated area) for the display of content-items as will be described hereinafter. In some embodiments the displayable area may be the same as the allocated area. An allocated area of a document can include a whole page, a singular area on a page, or multiple areas on a page, or any other suitable area of a document that is desired to be packed with content-items. It will be appreciated that complex areas of a document can be divided into regular shapes that can be more easily packed with content-items, for example, an 'L' or 'T' shape can be converted into two rectangles. A 'U' shape may be converted into three rectangles. In some embodiments of the invention, an allocated area of a document will be limited to one page, and content-items cannot flow from one page of the document to another.

Figure 1:
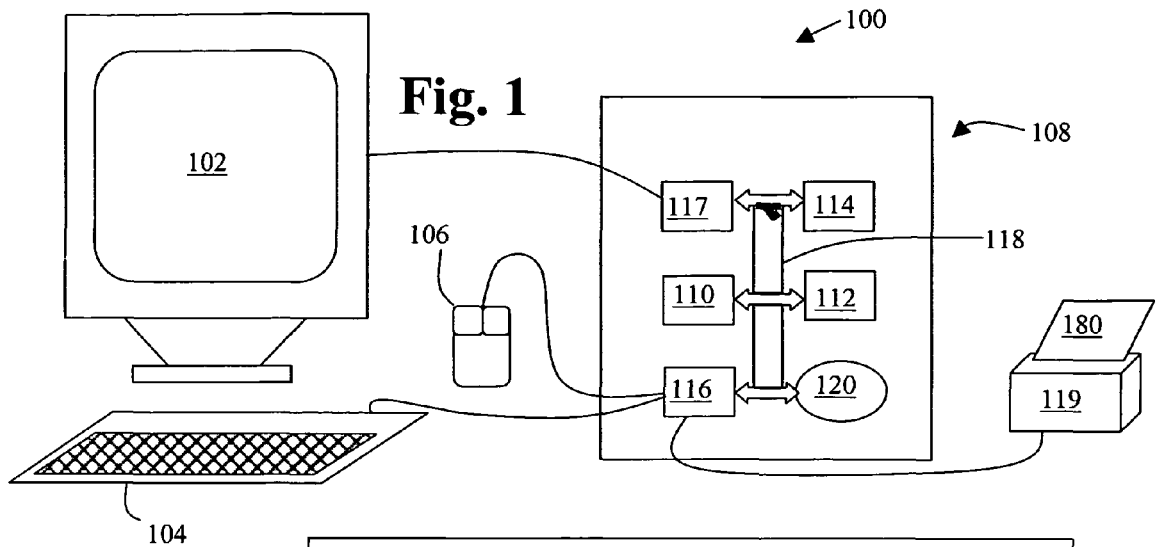
FIG. 1 shows a computer system arranged to provide one embodiment of the present invention.

FIG. 1 shows a computer 100 arranged to accept data and to process that data. The computer 100 comprises a display means 102, in this case a Cathode Ray Tube (CRT) display, a keyboard 104, a mouse 106 and processing circuitry 108. It will be appreciated that other display means such as LEP (Light Emitting Polymer), LCD (liquid crystal display), projectors, televisions and the like may be equally possible.

The processing circuitry 108 comprises a processing means 110, a hard drive 112 (containing a store of data), memory 114 (RAM and ROM), an I/O subsystem 116 and a display driver 117 which all communicate with one another, as is known in the art, via a system bus 118. The processing means 110, often referred to as a processor) typically comprises at least one INTEL™ PENTIUM™ series processor, (although it is of course possible for other processors to be used) and performs calculations on data. Other processors may include processors such as the AMD™ ATHLON™, POWERPC™, DIGITAL ALPHA™, and the like.

The hard drive 112 is used as mass storage for programs and other data. The memory 114 is described in greater detail below and with reference to FIG. 2.

The keyboard 104 and the mouse 106 provide input means to the processing means 110. Other devices such as CDROMS, DVD ROMS, scanners, etc. could be coupled to the system bus 118 and allow for storage of data, communication with other computers over a network, etc. Any such devices may then comprise further input means.

The I/O (Input/Output) subsystem 116 is arranged to receive inputs from the keyboard 104 and from the processing means 110 and may allow communication from other external and/or internal devices. The display driver 117 allows the processing means 110 to display information on the display 102.

The processing circuitry 108 further comprises a transmitting/receiving means 120, which is arranged to allow the processing circuitry 108 to communicate with a network. The transmitting/receiving means 120 also communicates with the processing circuitry 108 via the bus 118.

The processing circuitry 108 could have the architecture known as a PC, originally based on the IBM™ specification, but could equally have other architectures. The processing circuitry 108 may be an APPLE™, or may be a RISC system, and may run a variety of operating systems (perhaps HP-UX, LINUX, UNIX, MICROSOFT™ NT, AIX™, or the like). The processing circuitry 108 may also be provided by devices such as Personal Digital Assistants (PDA's), mainframes, telephones, televisions, watches or the like.

The computer 100 also comprises a printer 119 which may be thought of as a printing means which connects to the I/O subsystem 116. The printer 119 is arranged to print documents 180.

Figure 2:
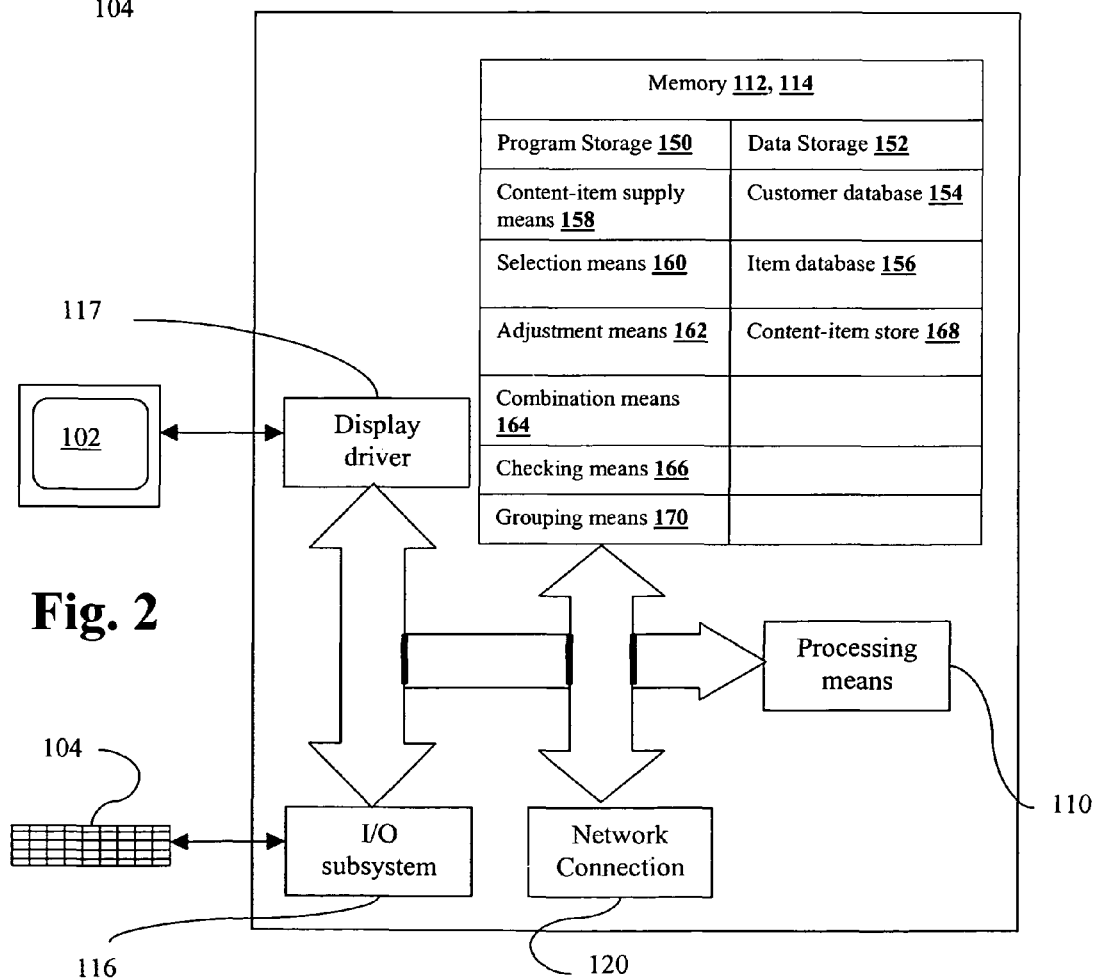
FIG. 2 shows detail of the memory of the computer system of FIG. 1.

FIG. 2 shows the memory 114 of the computer 100 of FIG. 1 in greater detail. It will be appreciated that although reference is made to a memory 114 it is possible that the memory could be provided by a variety of devices. For example, the memory may be provided by a cache memory, a RAM memory, a local mass storage device such as the hard disk 112, any of these connected to the processing circuitry 108 over a network connection such as via the transmitting/receiving means 120. However, the processing means 110 can access the memory via the system bus 118, accessing program code to instruct it what steps to perform and also to access the data. The processing means 110 then processes the data as outlined by the program code.

The memory 114 is used to hold instructions that are being executed, such as program code, etc., and contains a program storage portion 150 allocated to program storage. The program storage portion 150 is used to hold program code that can be used to cause the processing means 110 to perform predetermined actions.

In this embodiment, the program code stored in the program storage portion 150 includes a content-item supply means 158, a selection means 160, an adjustment means 162, a combination means 164 and a checking means 166. The function of these will be expanded upon hereinafter.

The memory 114 also comprises a data storage portion 152 allocated to holding data and in embodiments of the present invention in particular provides a customer database 154 and an item database 156. The customer database 154 contains data relating to customers preferences and the item database 156 contains information on that it may be desired to insert into the printed document that it being laid out. The data storage portion also contains a content-item store 168.

FIG. 3 shows two variations of how two content-items 302, 304 can be adjoined. Content-items can be photographs, drawings, charts, graphs or any other item that can be placed in a document. In some embodiments passages of text, including titles, can be considered as content-items. In other embodiments passages of text are not considered as content-items as it can be undesirable to change the size of passages of text and create inconsistencies between the sizes of the fonts for different passages of text.

Each edge of a content-item 302, 304 has what is known in the art as an alignment line associated with it. For example, the bottom edge of content-item 302 has alignment line 306 associated with it, and the bottom edge of content-item 304 has alignment line 308 associated with it. The total number of alignment lines present in a document is known as it's Birkhoff number, and the lower the Birkhoff number, the less cluttered and more pleasant a document will be to look at. It is therefore an aim of some embodiments of the present invention to produce a document having a minimal number of alignment lines, and therefore a low Birkhoff number.

Figure 3A:
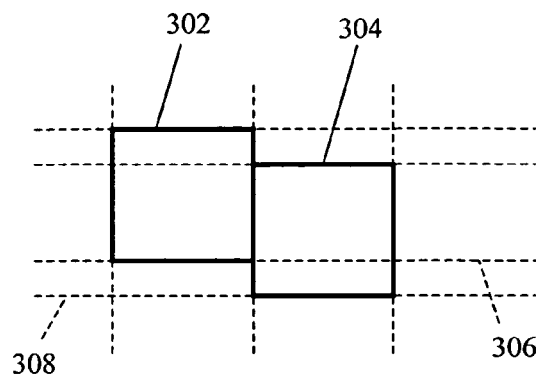
FIG. 3 shows alignment lines present when two content-items are adjoined.
Figure 3B:
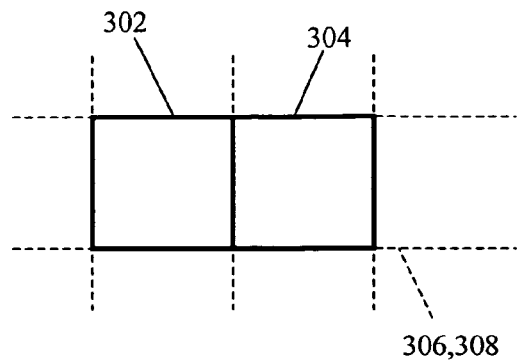

In FIG. 3a the two content-items 302, 304 are placed next to each other The arrangement shown in FIG. 3a produces seven alignment lines. The arrangement shown in FIG. 3b shows the two content-items 302, 304 placed next to each other having a common side completely in contact with the other content-item 302, 304. It can be seen that in this embodiment the alignment lines 306 and 308 associated with the bottom edges of the content-items 302, 304 coincide, and that the total number of alignment lines associated with the arrangement has been reduced to five. In some embodiments of the present invention it is an aim to join two content-items with sides of common length in order to reduce the total number of alignment lines present in a document and to produce regular boundaries between content-items.

Figure 4A:
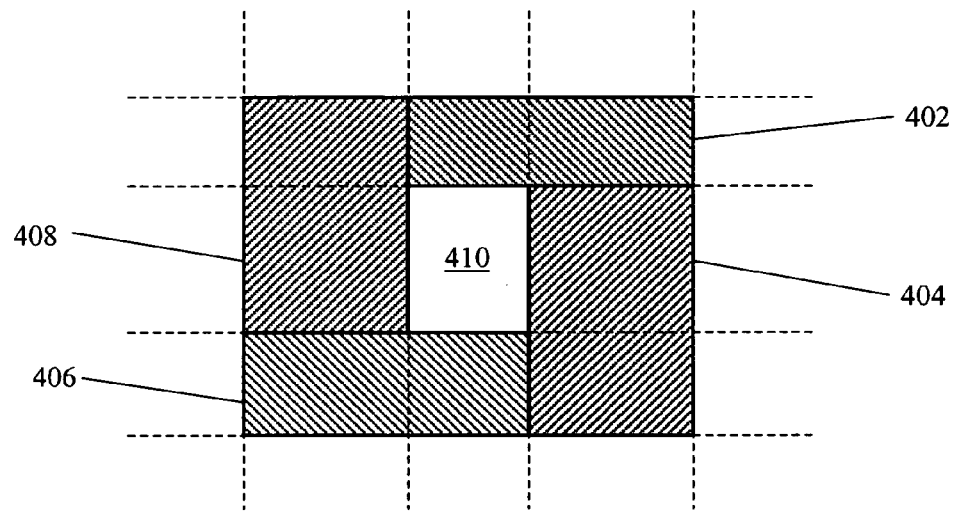
FIG. 4 shows arrangements of content-items that should be avoided according to embodiments of the present invention.

FIG. 4a shows a possible arrangement of four content-items 402, 404, 406, 408. This arrangement is unacceptable according to some embodiments of the present invention, as the arrangement produces irregular boundaries. This arrangement produces eight alignment lines, which may be more alignment lines than is deemed acceptable by a set of pre-defined design rules.

Figure 4B:
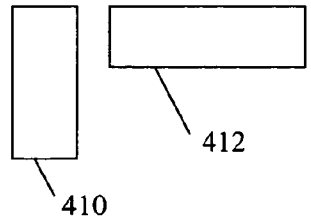

FIG. 4b shows two content-items 410, 412 that are to be adjoined to each other. As discussed above it is preferable to adjoin content-items by sides of common length, but in this example the two content-items 410, 412 do not have a side of common length. To overcome this, one content-item may be resized while maintaining a constant aspect-ratio of the content-item. The aspect-ratio of a content-item is calculated by dividing its height by its width, and it is desired to keep this constant according to some embodiments of the invention, as discussed later.

Figure 4C:
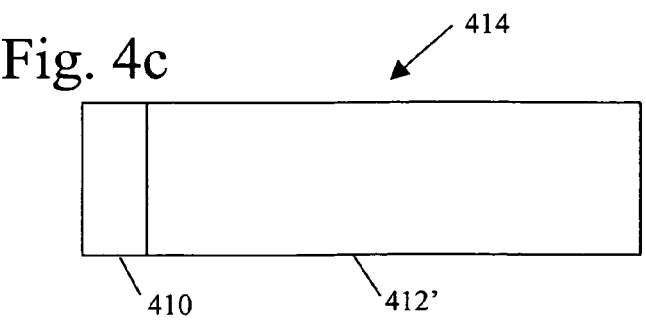

FIG. 4c shows what may be deemed an unacceptable arrangement of the content-items 410, 412 illustrated in FIG. 4b. Content-item 412 has been scaled up so that it is the same height as content-item 410, to produce content-item 412' which, due to its large relative size, appears more important than content-item 410. The aesthetic criterion of homogeneity states that if content-items are to have the same impact they should be roughly balanced and that some content-items should not be significantly bigger or smaller than others. If it is desired to make a content-item have an increased, or reduced, impact then it is possible to break this criterion.

In embodiments of the present invention where the aesthetic criterion of homogeneity is to be adhered to, relatively tall content-items should not be adjoined with relatively wide content-items. Tall content-items should generally be adjoined to other tall content-items by vertical edges, and wide content-items should generally be adjoined to other wide content-items by horizontal edges to adhere to the aesthetic criterion of homogeneity.

It will be appreciated that any other design rules and customer preferences can be considered when adjoining content-items to form a composition of content-items.

FIG. 5a shows two content-items 502, 504 that are to be combined and placed in a document. In this example, the aspect-ratio of content-item 502 is 0.66 (⅔), and the aspect-ratio of content-item 504 is 2 (4/2).

In order to produce a professional looking document it is perhaps desirable not to distort content-items when placing them in the document. It is therefore desired to maintain a constant aspect-ratio of any content-items that are resized when adjoined to other content-items to be placed in the document.

FIG. 5b shows one possible way of adjoining the two content-items 502, 504 to be placed in a document according to an embodiment of the present invention. The size of content-item 502 is kept constant, content-item 504 is scaled by a factor of 0.5 whilst maintaining a constant aspect-ratio. The dimensions of content-item 504 have changed from 4 cm×2 cm to 2 cm×1 cm, resulting in resized content-item 504'. Both content-items 502, 504' now have a vertical side 508, 510 of 2 cm that can be placed adjacent each other when the two content-items 502, 504' are combined. Adjoining two content-items with a side of common length helps minimize the number of alignment lines, ensures that no content-items overlap, provides regular boundaries between content-items and prevents gaps being produced between content-items as discussed above in relation to FIG. 4a.

Mathematically, the aspect-ratio 'R' of the resultant composition of two content-items having aspect-ratios r1 and r2 that have been joined by a common vertical edge is:

$$R = \frac{1}{\frac{1}{r1} + \frac{1}{r2}} \quad (1)$$

It is observed that for a combination made by a vertical edge, 'R' is always less than the lowest individual aspect-ratio, r1 or r2.

FIG. 5c shows an alternative way of adjoining the two content-items 502, 504 shown in FIG. 5a. In this arrangement content-item 504 has been scaled by a factor of 1.5 to result in content-item 504" having dimensions 6 cm×4 cm. Scaling by a factor of 1.5 means that content-item 504" has horizontal sides 518, 520 of length 3 cm, which is the same length as the horizontal sides 514, 516 of content-item 502. Horizontal sides 516 and 518 of content-items 502 and 504" respectively, are placed next to each other in order to produce a combined content-item.

Mathematically, the aspect-ratio of the resultant combination R of two content-items having aspect-ratios r1 and r2 that have been joined by a common horizontal edge is:

$$R = r1 + r2 \quad (2)$$

It is observed that for a combination made by a vertical edge, R is always greater than the largest individual aspect-ratio, r1 or r2.

It will be appreciated that in other embodiments the vertical sides 506 and 512 of content-items 502 and 504' respectively as shown in FIG. 5b can be placed adjacent each other in order to produce a content-item having the same combined aspect-ratio as the arrangement shown in FIG. 5b. Also, in an alternative arrangement to that shown in FIG. 5c, the horizontal sides 514 and 520 of content-items 502 and 504" respectively could be placed adjacent each other.

The common sides that are selected to be placed adjacent to each other can be chosen based on predefined rules. The rules may be set according to customer preferences or may be based on well-known design rules, such as those discussed above.

FIG. 6 shows an example of how eight content-items (i.e. a set of content-items) can be packed together in order to fill an allocated area of a document. In this example the content-items are images 601, 602, 603, 604, 605, 606, 607, 608 that are to be placed onto a page 616 of a catalogue as illustrated in FIG. 6a. The page 616 of the catalogue consists of two areas 618, 620. The first area 618 of the page 616 is reserved for images (and as such is an allocated area) and the second area 620 of the page 616 is reserved for text that describes the images placed in area 618. Thus, in this embodiment the allocated area is less than the displayable area of the page 616.

In this embodiment of the invention, the text is considered as a non-scalable content-item and is therefore considered separately to the images that can be scaled. In this embodiment, the images can be scaled but retain a constant aspect-ratio in order that the images do not become distorted, and make the catalogue look unprofessional. The aspect-ratio of the allocated area 618 of the page 616 defines the target aspect-ratio R that a composition of the eight combined images should satisfy in order to fill the page 616 without leaving any gaps.

The method consists of using a predefined set of rules to select two images that are to be placed adjacent each other in the document. The two images will be adjoined to form one new image for subsequent combination with other images until all of the images have been combined, and one composition of all of the images remains. The rules used to select which content items are to be joined may take into account the aspect-ratios of the images, the colour, contrast, focal point/s or any other physical attribute of the images or any customer-specific rules that have been set. In the embodiment being described the images 601-608 are selected by closest aspect ratio. Tall images are joined with tall in 612 to form wider composition, which is then joined with similar aspect ratio image 604 and so on.

Figure 6A:
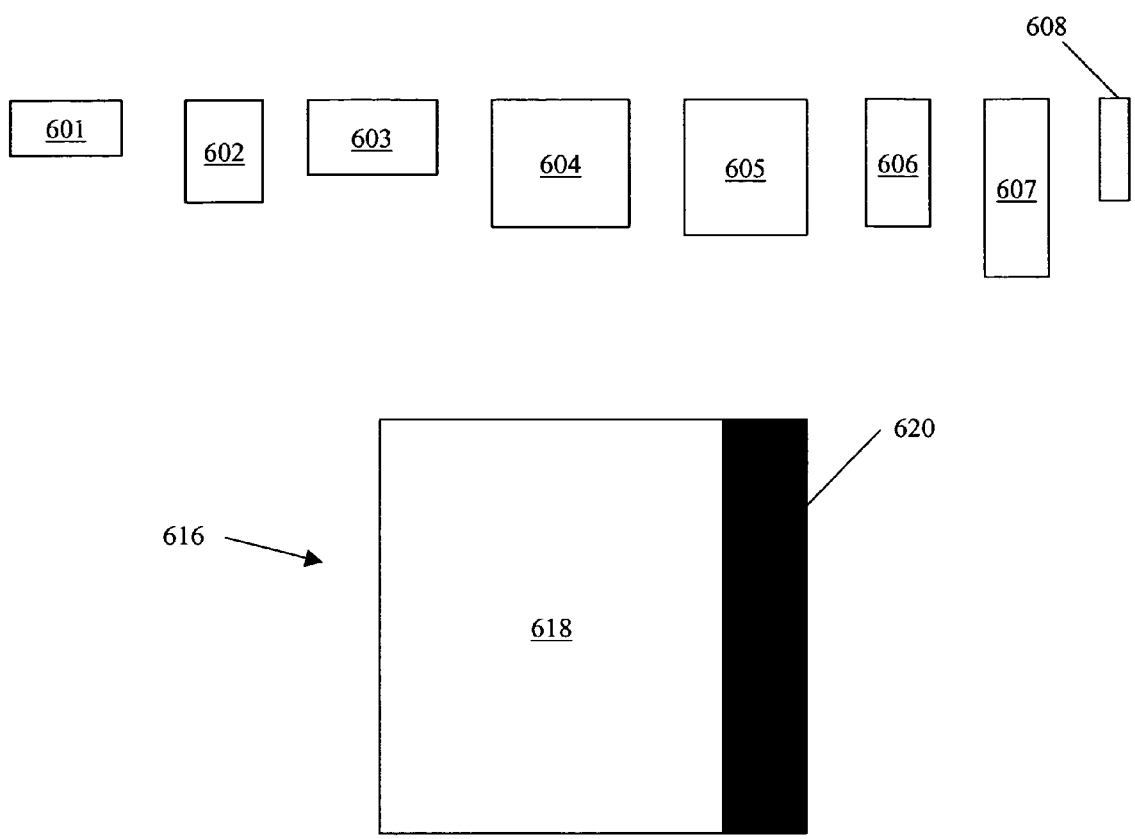
FIG. 6 shows how eight content-items can be arranged to fit in an allocated area of a page according to an embodiment of the present invention.
Figure 6B:
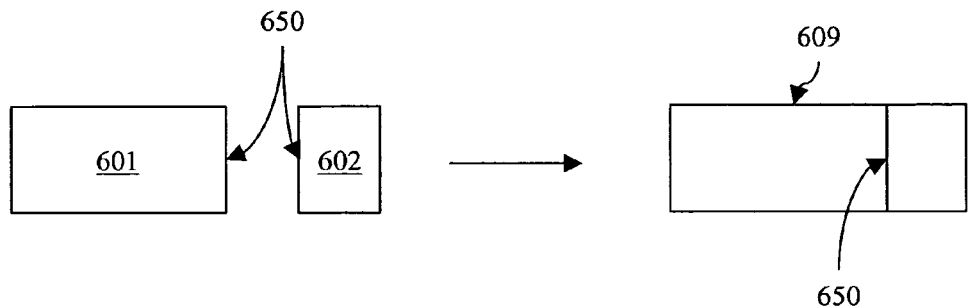

FIG. 6b shows that images 601 and 602 have been selected to be combined by a common vertical edge 650. Before the images 601, 602 can be joined an assessment is made of the heights: in order that the two images 601, 602 have a vertical edge of the same length (for the reasons discussed earlier), image 601 is adjusted by scaling the height until it is the same as that of image 602. In this example image 601 is enlarged, and the aspect-ratio of image 601 is maintained at a constant value whilst the image 601 is being scaled. Once the two images 601, 602 have a vertical edge of the same length, they are combined at these edges to form new image 609. It will be appreciated that the size of image 602 could be reduced to the same height as image 601 to produce the same result.

In reality only two images/compositions that should be joined together are selected, and neither of them are actually scaled. When the whole composition is finalized (has the acceptable aspect ratio) then all images are scaled once according to their final sizes. The final sizes of individual images are defined by their positions in the joining sequence and by the size of the empty space available on the page. Accordingly, one scaling per original image is performed, and not a sequence of scalings up and down. At every step two images are selected for joining and a virtual joining is performed by the side of common length. In the final layout those that were 'virtually' combined by the side of the common length are actually combined by the side of the common length.

Likewise and as discussed in relation to FIGS. 6c to 6o further pairs of images are selected for joining. After the selection of each of these pairs an assessment is made as to whether to join vertically or horizontally. The ultimate goal is for aspect ratio of composition to approach the aspect ratio of the allocated space as close as possible.

Figure 6C:
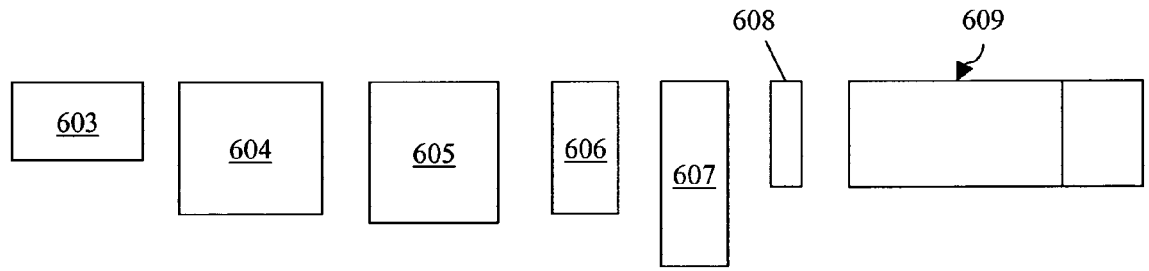

FIG. 6c shows the seven images 603, 604, 605, 606, 607, 608, 609 that remain to be combined after the combination shown in FIG. 6b.

Figure 6D:
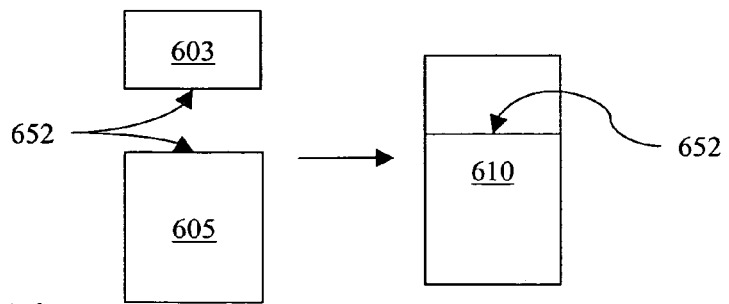

At FIG. 6d images 603 and 605 are combined by a horizontal edge, which provides a common horizontal edge 652. Image 605 is scaled down in order that it is the same width as image 603 (i.e. to provide a side of common length), and then the two images are combined in order to form new image 610.

Figure 6E:
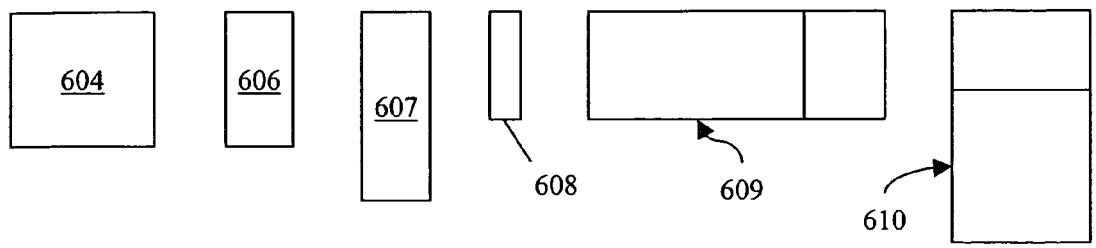
Figure 6F:
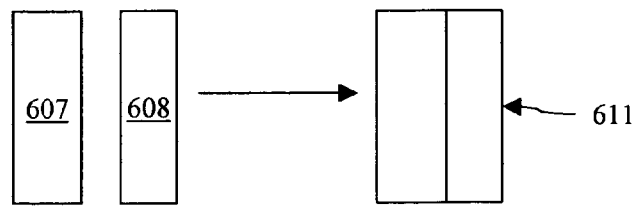

FIG. 6e shows the six images 604, 606, 607, 608, 609, 610 that remain following the combination shown in FIG. 6d. The six images are considered by the method and images 607 and 608 are selected to be adjoined by their vertical edges (to provide a common vertical edge) as shown in FIG. 6f. Image 608 is scaled up in order that it is the same height as image 607 (i.e. to provide a side of common length). Images 607 and 608 are then adjoined at their vertical edges to form new image 611.

Figure 6G:
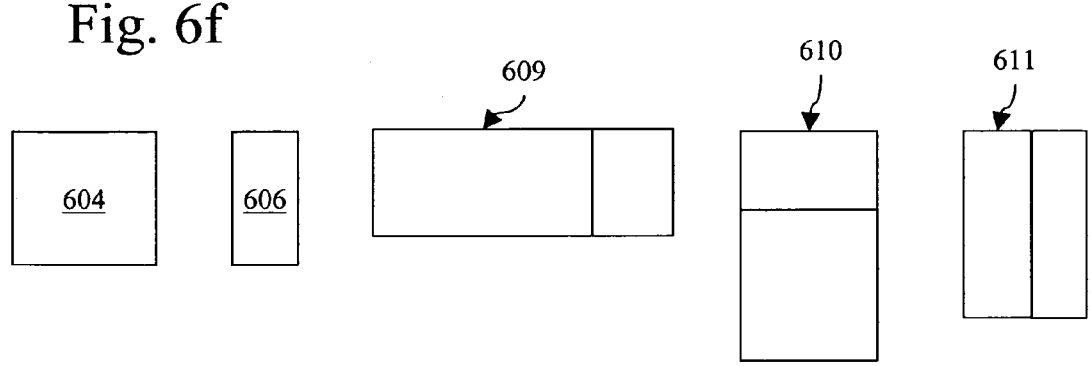
Figure 6H:
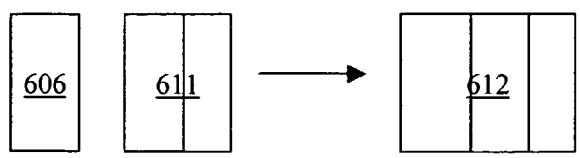

Following the combination shown in FIG. 6f, five images 604, 606, 609, 610, 611 remain to be combined as shown in FIG. 6g. In FIG. 6h, image 611 is scaled down until it has a vertical edge that is the same length as a vertical edge of image 611. Image 606 is then combined with image 611 by the vertical edge of common length in order to form new combined image 612.

Figure 6I:
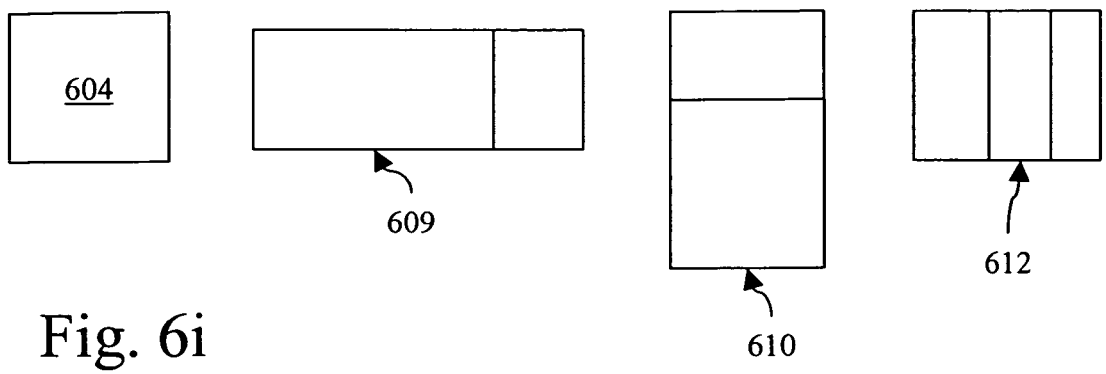
Figure 6J:
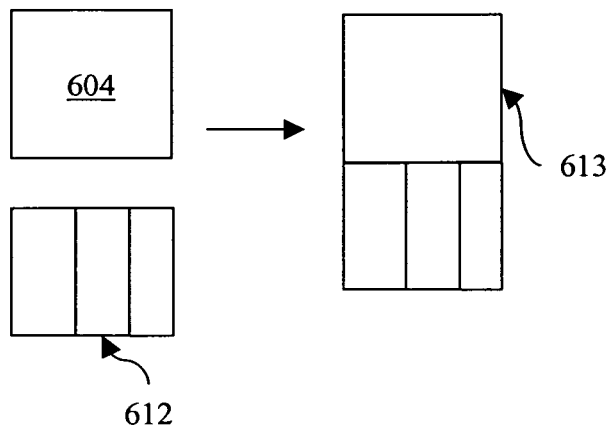

Four images 604, 609, 610, 612 now remain to be combined as shown in FIG. 6i. In FIG. 6j, image 612 is scaled down to be the same width as image 604, and the two images 604, 612 are combined to form new image 613.

Figure 6K:
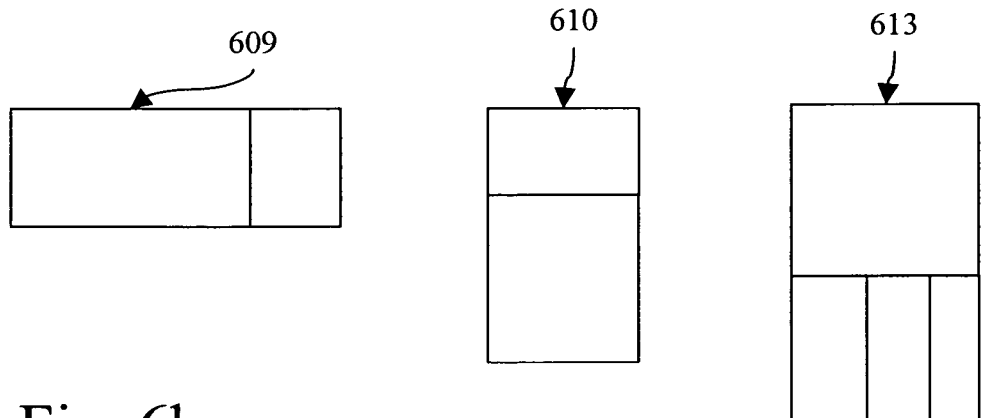
Figure 6L:
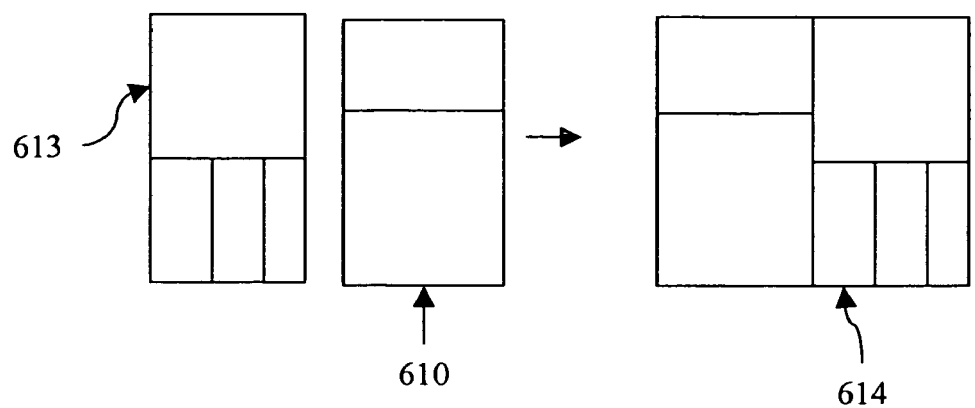

FIG. 6k shows the three images 609, 610, 613 that remain following the combination of FIG. 6j. In FIG. 6l, images 613 and 610 are combined by a vertical edge following the scaling down of image 613 to be the same height as image 610. The combination of images 613 and 610 create new image 614.

Figure 6M:
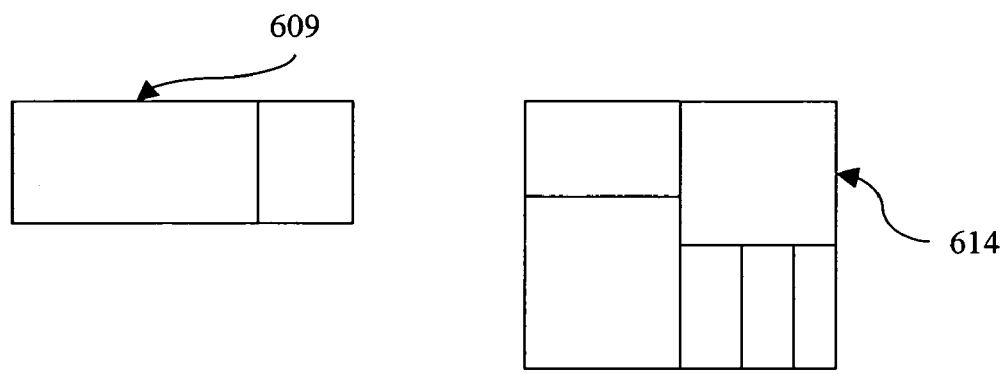
Figure 6N:
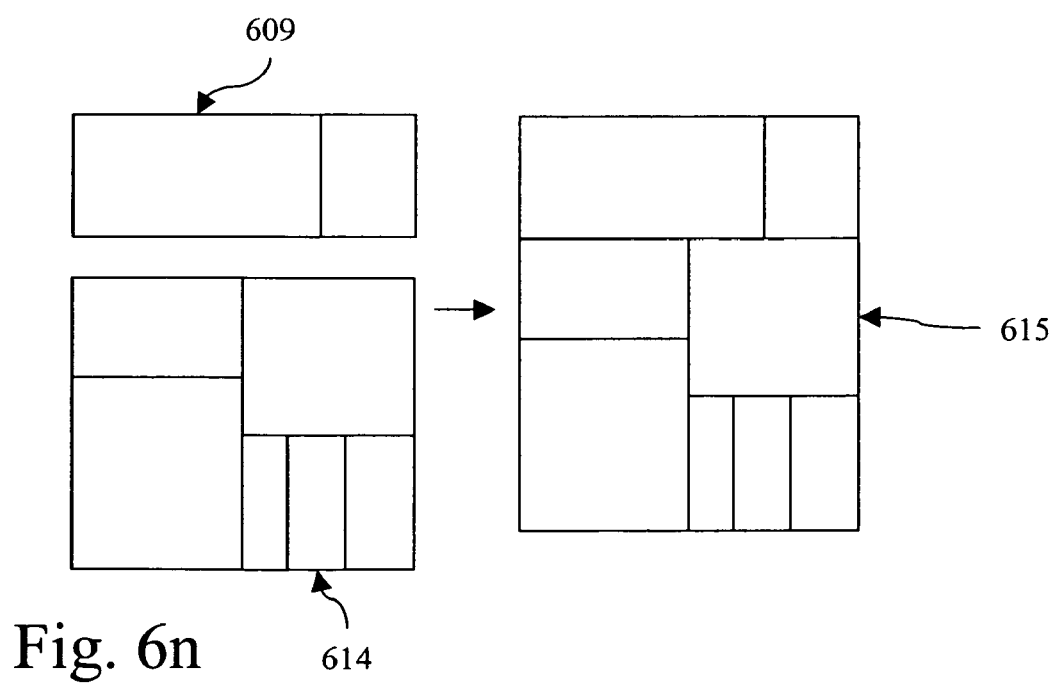

Images 609 and 614 remain to be combined in FIG. 6m, and FIG. 6n shows that image 614 is scaled up in order to be the same width as image 609. The two images 609, 614 are then combined by the bottom edge of image 609 and the top edge of image 614 to make the final composition of images 615.

Figure 6O:
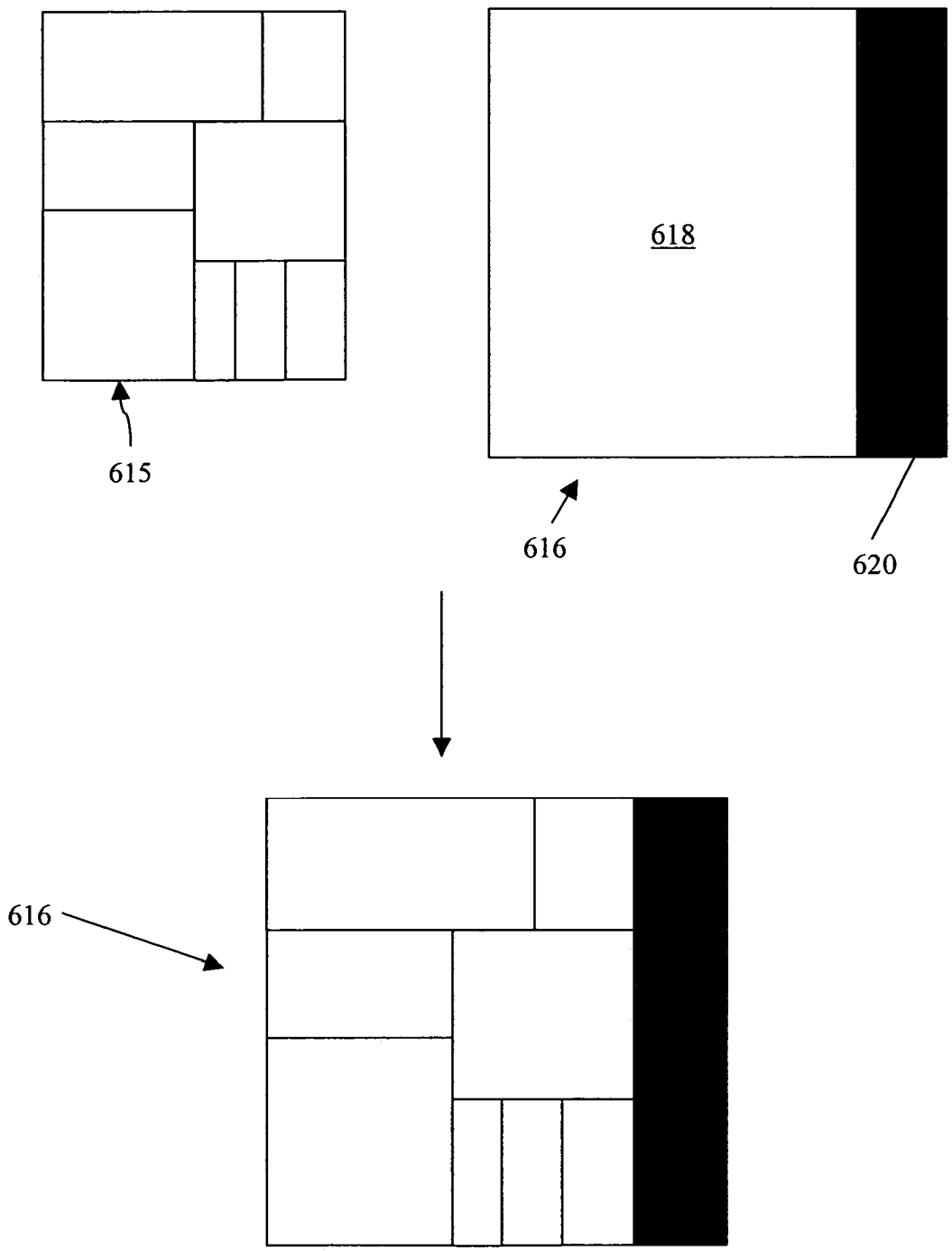

FIG. 6o shows that the final composition of images 615 is scaled up to fit in the allocated area 618 of the page 616 of the catalogue. In this example, no further compositions of images are tried as a suitable composition has been found. In other embodiments, alternative combinations may be tried in an attempt to better satisfy rules associated with the design of the catalogue page. It will be appreciated that the final composition of images 615 may be varied by altering the order in which the images within the set of images are selected for joining to one another.

To emphasise a point made earlier, in a preferred embodiment, when a pair of images (or combinational images) are selected to be joined together, no actual image scaling takes place (1. it is too expensive 2. an image quality will degrade) Required transformation is computed, recorded, but not applied. Then all necessary transformations for every individual original image are accumulated into a single final transformation that is applied at the very end. Technically Rcomp is computed (as described below) and then transformations necessary for every individual image from the original set of images are computed.

In some embodiments, a variety of combinations might be tried until a set number, say roughly any of the following: 3, 4, 5, 10, 15, 25, 50, any number in between, or any other suitable number, of successful compositions have been found, and the best (according to a predetermined criteria) composition is selected. In other embodiments all possible compositions may be obtained and the best one is selected.

Using equations (1) and (2) above, it can be seen that the aspect-ratio of the composition of images generated by the combinations shown in FIG. 6 can be expressed mathematically as:

$$Rcomp = \frac{1}{\frac{1}{r1}+\frac{1}{r2}} + \frac{1}{\frac{1}{r4+\frac{1}{\frac{1}{r6}+\frac{1}{r7}+\frac{1}{r8}}}+\frac{1}{r3+r5}}$$

where $R_{comp}$ is the aspect-ratio of the composition, and $r1 \ldots r8$ are the aspect-ratios of images 601 . . . 608.

Figure 7:
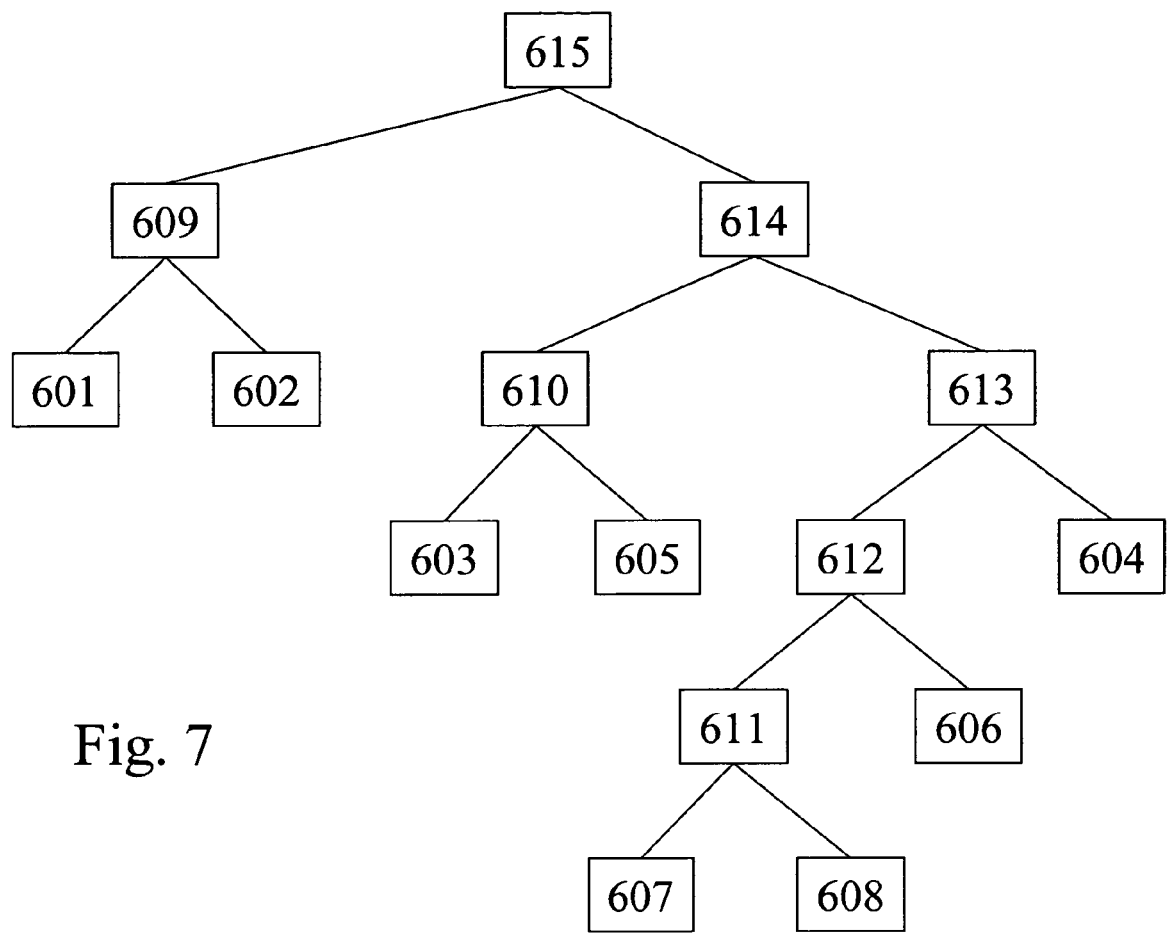
FIG. 7 shows a binary tree diagram of how the eight content-items are arranged according to FIG. 6.

FIG. 7 shows a binary tree diagram representation of how the eight original images 601, 602, 603, 604, 605, 606, 607, 608 are combined in FIG. 6 to form one composition 615 that consists of all of the original images in the set of content-items being considered.

Illustrating the combination of images as a tree diagram demonstrates how some content-items can be given a higher priority than other content-items. For example, images 601 and 602 are high up the tree diagram and therefore are not subsequently combined with many other images before the final image 615 is reached. Images 601 and 602 can be considered as having a high priority. In contrast, images 607 and 608 are at the bottom of the tree diagram and are considered as having a low priority as they are combined with more images than an image having a high priority before the complete combined image 615 is reached. It is likely that individual images 607 and 608 will be smaller than images 601 and 602 in the final composition of images 615.

In some embodiments, specific content-items can be pre-set with a high or low priority (i.e. a high or low importance criterion respectively) and these can be considered when the system selects which two content-items to combine and therefore what level in the tree diagram the content-items will be positioned. In alternative embodiments, it can be specified that all content-items are of equal importance and that they should each have a similar priority. In this embodiment, the images that are chosen to be combined will result in an even (balanced) tree diagram, with little difference between the depths in the tree diagram of the original content-items.

In some embodiments, an exhaustive search of all possible binary trees can be performed. These embodiments may be particularly advantageous if there are a small number of content-items to be combined. In other embodiments, stochastic searches may be performed to produce a number of binary trees for a large number of content-items.

Figure 8:
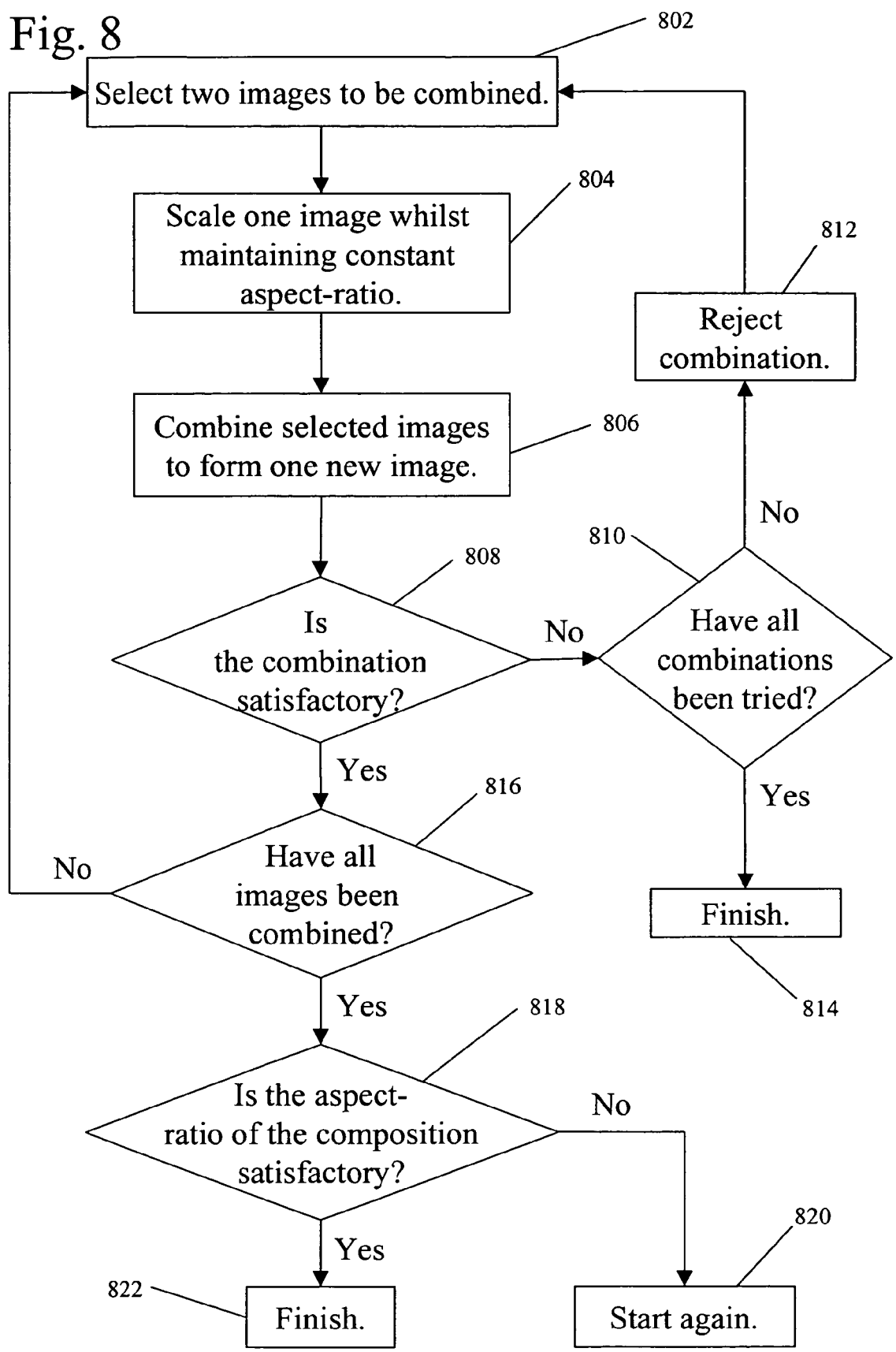
FIG. 8 shows a flowchart outlining the steps performed when carrying out an embodiment of the present invention.

FIG. 8 is a flowchart showing the steps of a method that are performed when combining images to fill an area of a document as shown in FIG. 6. Once again, it should be borne in mind in the method illustrated in FIG. 8, that no actual scaling takes place in mid computation, because it is expensive and image quality is liable to degrade. A total, final scaling transformation is computed and applied once to the original image in the same way an actual final place on a page is computed. Referring now to FIG. 8 for the purpose of describing the method step by step, at step 802, two images are selected as being suitable for combination according to the rules being used in that embodiment. In this embodiment it is the selection of two images having approximately equal aspect ratios. The program storage portion 150 of memory 112, 114 provides a selection means 160 that can perform this step of the method and an example of how the two images can be selected is discussed later with reference to FIG. 9a. At step 804, an assessment is made of the size of the images which shows that one of the images selected at step 802 should be resized, maintaining a constant aspect-ratio during the resizing operation, in order that it is the same height or width as the other selected image. An adjustment means 162 within the program storage portion 150 of memory 112, 114 can perform this step of the method. It will be appreciated that resizing of one of the images might not be required if both images are already the same height or width.

The two images are then joined at their sides of common length at step 806. Step 806 can be performed by a combination means 164 within the program storage portion 150 of memory 112, 114. The two joined images form one new combined image. The total number of images to be combined is therefore reduced by one.

At step 808, the newly combined image is checked against a set of design rules (as discussed earlier) to see if it is satisfactory. A checking means 166 within the program storage portion 150 can perform step 808 of the method.

If the combination is considered unsatisfactory, then at step 810 it is determined whether or not all combinations have been tried. If all of the combinations have not been tried, then the combination is rejected at step 812, and the method returns to step 802 where two different images are selected to be combined. If it is determined that all combinations of images have been tried at step 810, the method finishes at step 814.

In some embodiments, the original assortment of images to be placed in the allocated area of the document can be changed if it is determined that no satisfactory combinations exist, and the method is performed again with the different images. This can include the addition and/or removal of one or more of the original images. It will be appreciated that the set of images in the set of images (set of content-items) may be a subset of a much larger set of images.

In some embodiments, a "filler" image, or other content-item, can be selected to be added to the original assortment of images if an acceptable composition of images has not been found. In some embodiments there may be plurality of "filler" images that can be selected from. Such filler images are often referred to as 'ballast and beauty'. The unacceptable composition of images may be corrected by the method when choosing the "filler" image to be added to the original assortment of images, to ensure that the selected "filler" image has an aspect-ratio that, when added to the composition, enables a successful composition to be created. In some embodiments of the invention, the method may select more than one "filler" image to be added to the original assortment of images. Further, it will be appreciated that there will more freedom to replace a 'balance and beauty' image with another image since it is not required to be in the document being prepared—the reason it is there is to fill space.

In some embodiments, the method selects the "best" composition of images for placement in the allocated area of the document. The method can attribute a score to a composition of images based on predefined design rules, where certain design rules can be given extra importance based on customers' preferences. Such design rules can include the quality of the combinations, for example the number of alignment lines, the regularity of the boundaries, any change of perceived impact by resizing images, etc. The design rules can also take into account physical qualities of the images, for example whether the colour of two adjacent images clash, whether the focal points of the individual images do not go well together in the composition of images, etc. This embodiment can be particularly advantageous where the method produces a number of compositions before the "best" composition is selected.

In some embodiments, a score is attributed to unacceptable compositions, and if no acceptable compositions are found, the "best" unacceptable composition is selected as the composition that is to be used. In some embodiments, a warning can be provided to a user that no acceptable compositions have been found, and that an unsatisfactory combination of images has been selected.

Returning to FIG. 8, if, at step 808, it is determined that the combination is satisfactory, it is then determined at step 816 whether or not all images have been combined. If all of the images have not been combined, the method returns to step 802 and two more images are selected to be combined. It will be appreciated that if there are initially 'n' images to be combined, there will be 'n–1' joining performed to produce one composition of all of the images.

If it is determined that all of the images have been combined at step 816, then the aspect-ratio of the composition of images is checked against the aspect-ratio of the allocated area of the document at step 818. Checking means 166 within the program storage portion 150 of memory 112, 114 can be used to perform this step of the method.

If the aspect-ratio of the composition of images is not acceptable as the aspect-ratio of the allocated area of the document, then the method may alternate the joining sequence: which images are joined to which, in what order and vertically or horizontally until the acceptable combination is reached step 820.

In other embodiments, if it is determined that the composition of images does not fit the allocated area in the document (i.e. the aspect-ratios are different), some of the combinations may be rejected. For example, the method may gradually step back through the individual combinations that have been made, trying alternative combinations at each level.

In alternative embodiments, if the aspect-ratio of the composition of images is "close" to the aspect-ratio of the allocated area of the document, the composition is deemed satisfactory and is accepted. This will be discussed in more detail later.

If it is determined at step 818 that the aspect-ratio of the composition of images does satisfactorily match the aspect-ratio of the allocated area of the document, the method finishes at step 822. In other embodiments, the method may be repeated until a set number of compositions of all images have been obtained, and the best complete composition can then be chosen according to the design rules. In further embodiments still, the method may be repeated until all possible compositions of images have been tried, and the best composition is then chosen. Where more than one acceptable composition has been found, the best composition is the one that has been given the highest score, as discussed earlier.

Figure 9A:
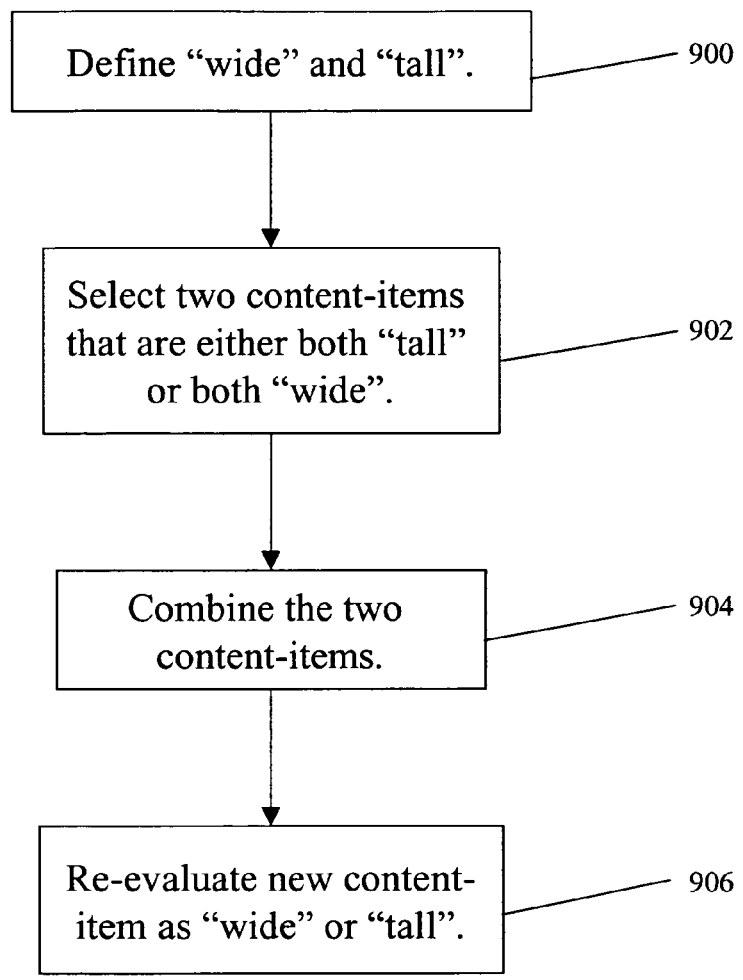
FIG. 9a shows a flowchart outlining the steps performed when selecting two content-items to be adjoined according to an embodiment of the present invention.

Returning to step 802 of the method illustrated in FIG. 8, one possible way in which two images can be selected will now be discussed with reference to FIG. 9a. This method prioritises satisfying the aesthetic criterion of homogeneity as discussed earlier. It will be appreciated that other methods can be used that prioritise other individual design criteria, or methods that give a balanced priority to a number of design criteria.

At step 900, "wide" and a "tall" content-items are defined, based on one, some, or all of: the aspect-ratio 'R' of the allocated area of the document 618; the distribution of the aspect-ratios of the individual content-items; or any other design rule. A content-item that has an aspect-ratio that is greater than '$R_{tall}$' is considered as a "tall" item, and a content-item that has an aspect-ratio that is less than '$R_{wide}$' is considered as a "wide" item.

In some embodiments '$R_{tall}$' will be the same as '$R_{wide}$', as this simplifies the calculations and ensures that all content-items can easily be classified as either "tall" or "wide". However, some distributions of aspect-ratios may require '$R_{tall}$' to be different to '$R_{wide}$', to enable greater flexibility in adjusting the final composition of content-items, and in this situation content-items that have an aspect-ratio between '$R_{tall}$' and '$R_{wide}$' can be treated as "tall" or "wide" depending on individual requirements. '$R_{tall}$' and '$R_{wide}$' are selected so that one of the following two equations are satisfied:

$$R_{tall} + R_{wide} = R \tag{3}$$

$$\frac{1}{\frac{1}{R_{tall}} + \frac{1}{R_{wide}}} = R \tag{4}$$

It can be determined from a customer's preferences and/or by analyzing the original assortment of content-items whether it is preferable to combine the final two content-items by a horizontal or vertical edge. If it is desired to combine the final two content-items by a horizontal edge, '$R_{tall}$' and '$R_{wide}$' are chosen so that equation (3) is satisfied. If it is desired to combine the final two content-items by a vertical edge, '$R_{tall}$' and '$R_{wide}$' are chosen so that equation (4) is satisfied.

It will be appreciated that if '$R_{tall}$' is selected to be the same value as '$R_{wide}$', and is called '$R_{boundary}$', then:

$$R_{tall} = R_{wide} = R_{boundary} \tag{5};$$

and equation (3) becomes $R_{boundary} = R/2$ (6);

and equation (4) becomes $R_{boundary} = 2R$ (7)

At step 902, two content-items are selected that are either both "tall" or both "wide". "Tall" items are selected to be combined by their vertical edges to produce an item having an aspect-ratio that approaches $R_{tall}$. The aspect-ratios of individual "tall" content-items will always be greater than '$R_{tall}$' for "tall" items, and as the combined aspect-ratio of images combined in this way will always be less than the minimum aspect-ratio of the individual content-items, the combined aspect-ratio approaches '$R_{tall}$' (it can go beyond it and composition can jump to wide ranges). Similarly, "wide" items are selected to be combined by their horizontal edges to produce an item having an aspect-ratio that approaches $R_{wide}$.

At step 904, the two selected content-items are combined and the aspect-ratio of the combined content-item is re-evaluated to see if it is a "tall" or a "wide" content-item at step 906.

All of the initial content-items are combined until two content-items remain, one having an aspect-ratio of '$R_{tall}$' and the other having an aspect-ratio of '$R_{wide}$'. If '$R_{tall}$' and '$R_{wide}$' have been chosen so that equation (4) is satisfied, the two content-items are combined by their vertical sides to produce a content-item with the desired aspect-ratio 'R'. '$R_{tall}$' and '$R_{wide}$' can be combined by their horizontal sides to produce the desired aspect-ratio if '$R_{tall}$' and '$R_{wide}$' have been chosen so that equation (3) is satisfied.

In some embodiments, if the combination of the initial content-items does not result in two content-items having aspect-ratios of '$R_{tall}$' and '$R_{wide}$', combinations of content-items can be rejected and two different content-items can be selected to be combined at step 902. In some embodiments '$R_{tall}$' and '$R_{wide}$' can be re-defined at step 900 if no combination of content-items can be found that results in two final content-items having aspect-ratios that are near enough to the values of '$R_{tall}$' and '$R_{wide}$'.

Figure 9B:
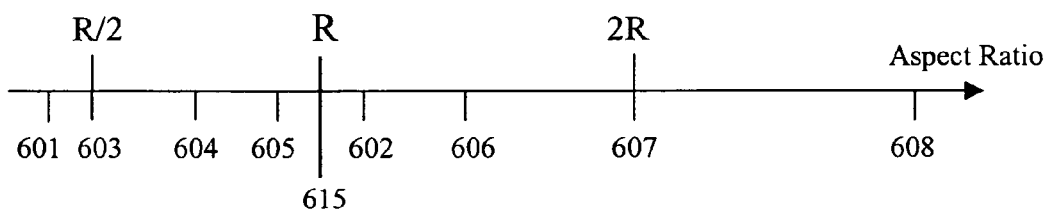
FIG. 9b shows how aspect-ratios can be indicated schematically on a line diagram according to an embodiment of the present invention.

FIG. 9b shows how the aspect-ratio of images 601, 602, 603, 604, 605, 606, 607, 608 and the target aspect-ratio 'R' can be illustrated schematically on a line diagram.

As content-items are combined, new content-items having different aspect-ratios are created, and the aim is that the combination between the last two content-items creates a final content-item having an aspect-ratio that is the same as the target aspect-ratio. In this example, the eight images 601, 602, 603, 604, 605, 606, 607, 608 are combined to create one final image 615. The aspect-ratio of the final image 615 is the same as the aspect-ratio of the allocated area 618 of document 616, shown as target aspect-ratio 'R', showing that a suitable arrangement for the images 601, 602, 603, 604, 605, 606, 607, 608 has been found.

In other embodiments, and as discussed with reference to equation (7) above, it may be preferable to define "$R_{tall}$" and "$R_{wide}$" as having the same value to satisfy certain design rules. For example to ensure that both of the final two content-items will have similar impact on a customer as they will both be the same size, that the final two content-items will be combined by a vertical edge, etc. This effectively sets an interim target of twice the aspect-ratio of the area to be filled with content-items, shown as '2R' in FIG. 9b. In this embodiment content-items are selected to be combined until only two content-items remain, both having an aspect-ratio of '2R'. The two content-items can then be combined by a vertical side of common length in order to provide one final content-item having the target aspect-ratio 'R'.

Similarly, in other embodiments it can be an aim to select content-items to be combined in order that the last two content-items have an aspect-ratio that is half the value of the target aspect-ratio 'R' to satisfy similar design rules as discussed above. The two content-items can then be combined by a horizontal side of common length in order to provide the final combined content-item of desired aspect-ratio. This embodiment is the same as that discussed with reference to equation (6) above.

It will be appreciated that other such interim targets can be defined according to a designers/customers preferences, by choosing certain values for "$R_{tall}$" and "$R_{wide}$".

In some embodiments of the invention it may not be possible to exactly match the aspect-ratio of a final composition of content-items with an area of a document to be filled (i.e. the allocated area). In these embodiments it may be necessary to combine all of the content-items to provide an aspect-ratio that is close to the target aspect-ratio, and then adjust the aspect-ratio of the individual content-items without distorting them, in order to enable them to fit exactly into the area of the document.

The purpose of the discussion which follows is to explain that, in the present embodiment, the aspect ratio of an image is desirably only changed through cropping, otherwise the image will be unacceptably disturbed. Cropping is a very delicate process in which not everything can be thrown away: there is Region of Interest (ROI) that should not be touched. This imposes limits on aspect ratio that can be achieved for any particular image. For example, an image W×H (width W and height H) and ROI w×h (width w and height h) the range of available aspect ratios that the above image can be cropped to is defined by:

$$h/W \leq r \leq H/w$$

Aspect ratios outside this interval are not reachable without cutting through ROI (forbidden!). Any aspect ratio inside the above interval is, howver, achievable. To show this lines MM', NN', OO', PP' are drawn in FIG. 15. MNPO is the widest possible crop (with aspect ratio h/W) and M'N'P'O' is the tallest possible crop (aspect ratio H/w). All other aspect ratios in the interval can be achieved by selecting correspondent intermediate positions.

Now consider a composition of images. Without crop its aspect ratio is defined by R. However, if some or all images are allowed to be cropped (at least one croppable image) then the aspect ratio of the whole composition is variable in the correspondent interval.

Figure 10:
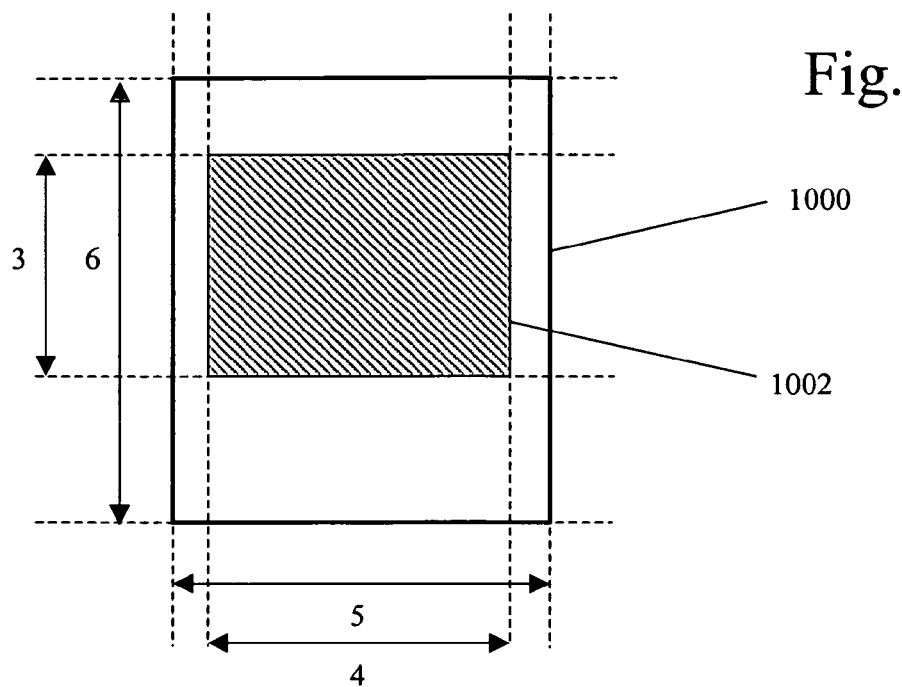
FIG. 10 shows a content-item having an area of interest according to an embodiment of the present invention.

FIG. 10 shows an image 1000, which is an embodiment of a content-item according to the present invention. The image 1000 has a region of interest 1002 that is a required part of the image 1000 and should not be cropped out of the image. The remainder of the image 1000 can be considered as a peripheral area of the image and can be cropped in order to adjust the aspect-ratio of the individual image 1000, and hence adjust the overall aspect-ratio of the combined images. The image may be stored in such a manner that the required part is noted therein, or separate data may be provided specifying which part of the image is required and which part is peripheral.

In this example the uncropped image 1000 has dimensions of 6 cm by 5 cm, that is an aspect-ratio of 1.2 (6/5). The minimum aspect-ratio that an image can have is when it is cropped to its minimum height, and its width is left at a maximum. The minimum aspect-ratio of image 1000 is 0.6, where its dimensions are 3 cm by 5 cm. Similarly, the maximum aspect-ratio of an image is when its height is left at a maximum, and its width is cropped to its minimum value. The minimum aspect-ratio that image 1000 can have is 1.5, when the image has been cropped to have dimensions of 6 cm by 4 cm.

FIG. 11 shows how the image 1000 of FIG. 10 can be cropped to adjust the overall aspect-ratio of a composition of images 1100. The composition of images 1100 comprises two images 1000, 1104. The allocated area that is to be filled by the combined image 1100 has an aspect-ratio of 0.5

Figure 11A:
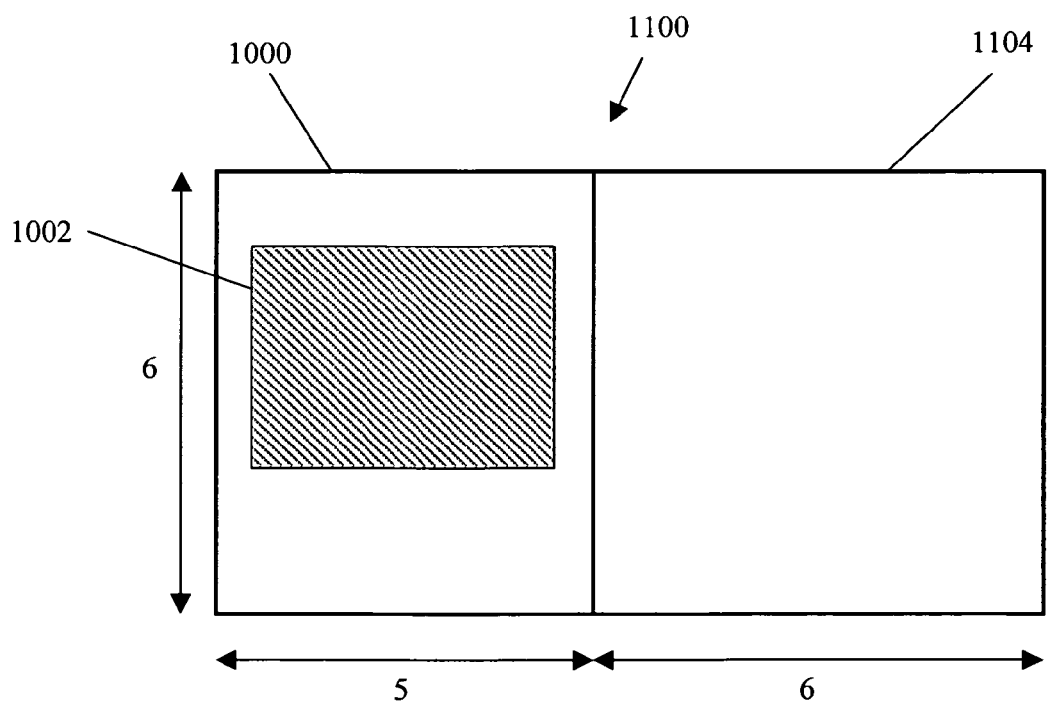
FIG. 11 shows how the content-item of FIG. 10 can be cropped to adjust the overall aspect-ratio when combined with another content-item according to an embodiment of the present invention.

FIG. 11a shows images 1000 and 1104 combined by a vertical side of length 6 cm. Image 1000 has dimensions 6 cm by 5 cm and image 1104 has dimensions 6 cm by 6 cm. The combined image 1100 therefore has dimensions 6 cm by 11 cm, and hence an aspect-ratio of 0.54 (6/11). It is desired to reduce the aspect-ratio of image 1100 to 0.5 to fit within the allocated area to be filled.

Figure 11B:
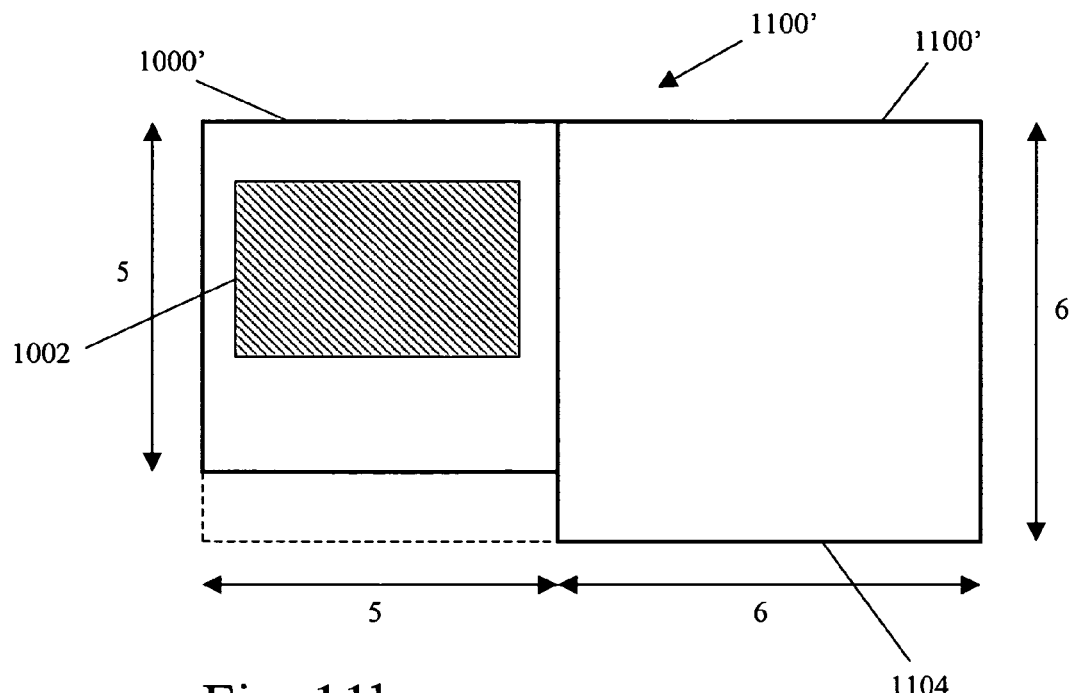

In FIG. 11b, image 1000' has had 1 cm cropped from its bottom edge. The area of interest 1002 of the image 1000' has not been affected by the cropping operation, and no region of the remaining image 1000' has been distorted by the cropping operation. The dimensions of image 1000' are now 5 cm by 5 cm.

Figure 11C:
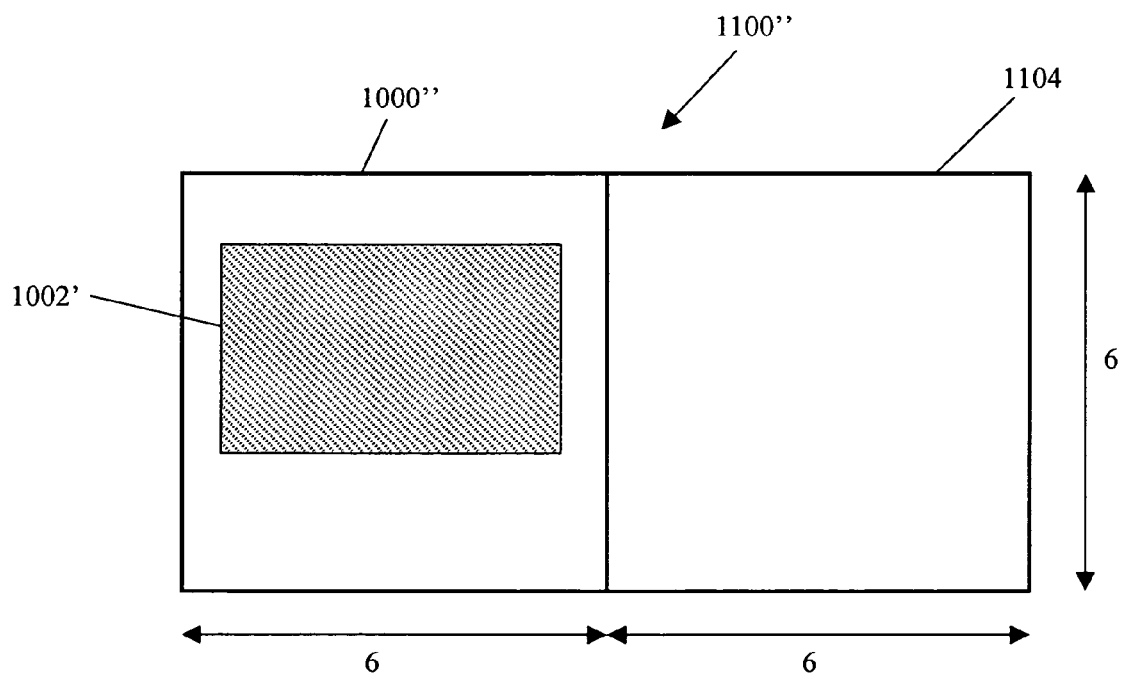

In FIG. 11c, image 1000' as shown in FIG. 11b has been scaled up to form image 1000" which is now the same height as image 1104. The aspect-ratio of the image 1000' is the same as image 1000", and therefore the image 1000", including the area of interest 1002' is not distorted as the aspect-ratio of the original image 1000 is adjusted.

The images 1000", 1104 shown in FIG. 1c are joined by a side of common length, as required according to some embodiments of the present invention. The dimensions of the scaled image 1000" are now 6 cm by 6 cm, and the dimensions of image 1104 remain as 6 cm by 6 cm. The dimensions of the combined image 1100" are therefore 6 cm by 12 cm which exactly matches the target aspect-ratio of 0.5. The overall aspect-ratio of the combined image 1100" has been adjusted without distorting the original images 1000", 1104.

In some embodiments, scaling of an image may not be required following a cropping operation, as the two sides of the image that are shortened by the cropping operation may not be adjoined with another image. For example, if it is desired to increase the aspect-ratio of the composition of images 1100 shown in FIG. 11a, it is possible to reduce the width of image 1000 by cropping vertically. This will increase the aspect-ratio of both the individual image 1000 and the composition of images 1100.

Figure 12:
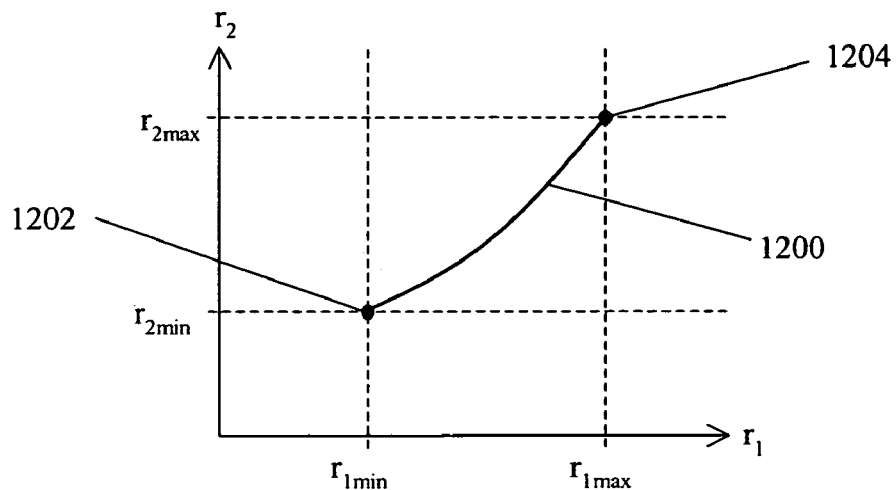
FIG. 12 shows graphically how the aspect-ratio of a composition of two content-items is affected by the variable individual aspect-ratios of the individual content-items according to an embodiment of the present invention.

FIG. 12 shows graphically how the overall aspect-ratio of a composition of content-items can be affected by cropping individual content-items. FIG. 12 is a two-dimensional example of a composition of content-items having two individual content-items that can be cropped. It will be appreciated that further dimensions are added to the graph for each additional content-item that is capable of being cropped. Therefore if there are four content-items that may be cropped then a four-dimensional problem is posed.

In some embodiments, the majority of the content-items within a composition can be capable of being cropped by a small amount. This can produce a significant effect on the range of aspect-ratios of the composition of content-items, without significantly effecting the appearance of the individual content-items.

In this example, the aspect-ratio of a first content-item $r_1$ is represented on the horizontal axis, and the aspect-ratio of a second content-item $r_2$ is represented on the vertical axis. The first content-item $r_1$ has a minimum aspect-ratio $r_{1min}$, and a maximum aspect-ratio $r_{1max}$. The second content-item $r_2$ has a minimum aspect-ratio $r_{2min}$, and a maximum aspect-ratio $r_{2max}$. The aspect-ratio of the composition of content-items is illustrated by the function 1200. It can be seen that the minimum value 1202 of the aspect-ratio of the composition of content-items is when the aspect-ratios of the individual content-items $r_1$, $r_2$ are at a minimum, and the maximum value 1204 of the aspect-ratio of the composition of content-items is when the aspect-ratios of the individual content-items $r_1$, $r_2$ are at a maximum. The function 1200 is a monotonically growing function that can be solved by a standard algorithm, to obtain the required aspect-ratios for the individual content-items to achieve the target aspect-ratio for the composition of content-items. The mathematics of the function that defines the aspect-ratio of the composition of content-items will be discussed later with reference to FIG. 15.

FIG. 13 shows schematically how a composition of images $r_{comp}$ having a variable aspect-ratio can be illustrated on a line diagram. The composition of images can have a variable aspect-ratio if it includes images that are capable of being cropped as discussed above. The composition of images has an aspect-ratio $r_{comp}$, that can have a minimum value of $r_{min}$ and a maximum value of $r_{max}$. The target aspect-ratio 'R' is the aspect-ratio of the allocated area of a document that is to be filled with the composition of images $r_{comp}$.

In FIG. 13a, the target aspect-ratio 'R' is outside the range of aspect-ratios for the composition of images $r_{comp}$. The composition of images $r_{comp}$, is therefore not a suitable composition for completely filling the area of the document without leaving any gaps or distorting the images.

In some embodiments where the target aspect-ratio 'R' is not within the range of achievable aspect-ratios for a given selection of individual content-items, a further content-item can be added to the initial selection of content-items.

The further content-item can have a relatively small area of interest, providing a highly variable individual aspect-ratio. This provides a greater range of aspect-ratios for the composition of content-items, and can increase the limits of the aspect-ratio of the composition to include the target aspect-ratio 'R', thus converting an unsuitable composition into a suitable composition.

FIG. 13b shows a composition of images $r_{comp}$, where the upper boundary of the aspect-ratio of the composition exactly matches the target aspect-ratio 'R'. In this case, all of the individual aspect-ratios are set to a maximum in order that the aspect-ratio of the composition of images is at its maximum value, and the target aspect-ratio 'R' is achieved.

In FIG. 13c, the target aspect-ratio 'R' lies within the range of aspect-ratios of the composition of images $r_{comp}$, and an algorithm as discussed with reference to FIG. 12 can be used to calculate the aspect-ratios of the individual images in order to achieve the target aspect-ratio 'R'.

FIG. 14 is a flowchart showing the steps of a method that are performed when individual images are cropped in order to alter the aspect-ratio of a composition of images. As described it is possible to crop one image at a time whilst trying to achieve the desired aspect ratio. Using algorithms similar to ref FIG. 12 the individual aspect ratios of images such that the overall composition will meet the desired value can be computed. Then all affected images are cropped and the composition reassembled. Initially the content-item supply means 158 supplies a plurality of content-items which are grouped by a grouping means 170 into a group of content-items. This grouping may or may not be performed by the embodiments described above. At step 1402, an individual image that forms part of a composition, or group, of images is identified as being suitable for cropping. Selection means 160 within the program storage portion 150 of memory 112, 114 can be used to perform this step of the method. The image is cropped, by an adjustment means 162, at step 1404, and the boundaries of the image are considered at step 1406 to determine whether scaling is required at step 1408. For example, if two sides of an image are shortened that do not adjoin another image, scaling may not be required. In other examples, scaling may be required to alter the aspect-ratio of the composition and to ensure that no gaps are left between images in the composition.

At step 1410, the aspect-ratio of the composition of images is compared with the target aspect-ratio of the allocated area that is to be filled with the composition of images. Checking means 166 of program storage portion 150 of memory 112, 114 can perform this step of the method. If the aspect-ratios do not match, the method returns to the start, and another image is identified as suitable for cropping at step 1402. If the aspect-ratio of the composition of images does match the target aspect-ratio, the method finishes at step 1414. In the present embodiment, as with scaling, cropping is not performed on a 'per image' basis. Required crops are computed and then every affected image is computed.

In alternative embodiments a border can be added to a content-item to adjust its aspect-ratio.

FIG. 15 shows an embodiment of a content-item 1500 defined by the points ABCD, according to the present invention. The content-item has an area of interest 1502 (i.e. a required area) defined by A'B'C'D', that is a required part of the content-item 1500, and a peripheral area of the content-item that is between the boundary ABCD of content-item 1500 and the boundary A'B'C'D' of the area of interest 1502.

When cropped to exclude some of the peripheral area of the content-item, the minimum height of the content-item is MN, the maximum height of the content-item is M'N', the minimum width of the content-item is N'P' and the maximum width of the content-item is NP. Therefore the aspect-ratio of the content-item is in the range:

$$\frac{MN}{NP} \le r \le \frac{M'N'}{N'P'} \qquad (8)$$

The line MM' is the line along which a vertex of a rectangle being adjusted between ABCD and A'B'C'D' would move. While vertices of rectangular candidate crops are moved along dashed lines every aspect ration in the range (8) can be achieved. So we can say that an image can be cropped continuously to any predefined value in the interval. We use this property to find values for every If the aspect-ratios of images are given in certain intervals $r_i \in [a_i, b_i]$, then we have a rational function $R_Q$ defined on the n-dimensional hyper-cube $$C = \prod_{i=1}^{n} [a_i, b_i].$$

Since $R_Q$ is a continuous function and C is a connected compact set, the image of C under $R_Q$ is a closed interval $[R_{min}, R_{max}]$.

It should be noted that partial derivatives of $R_Q$ have a constant sign. We can see this from the fact that when all $R_j$, $j \ne i$ are fixed, the function $R_Q$ has the following form:

$$R_Q = \frac{\alpha r_i + \beta}{\gamma r_i + \delta} \qquad (9)$$

Moreover, it can be easily shown that $R_Q = R_Q(r_1, \ldots, r_n)$ is a monotonically increasing function from any of the variables $r_i$. Therefore, the minimum value of $R_Q$ is achieved when $R_{Qmin} = R_Q(r_1^{min}, \ldots, r_n^{min})$ and the maximum value is when $R_{Qmax} = R_Q(r_1^{max}, \ldots, r_n^{max})$, which enables the range of $R_Q(r_1, \ldots, r_n)$ to be determined.

The possibilities for providing a solution when cropping are as follows:

1. $R_O \in [R_{min}, R_{max}]$. Then there exists the point $x \in C$ such that $R_Q(x) = _O$. Moreover, such x can be found on the line segment that connects $R_{max}$ and $R_{min}$. Such x provides a set of aspect-ratios for a full and exact filling. This is the situation illustrated in FIG. 13c.

2. $R_O \notin [R_{min}, R_{max}]$, but is relatively close to this interval.
   a. $R_O < R_{min}$ and $R_{min} - R_O$ is small, the allocated area can be filled using $R_{min}$ and adding "filler" content-item/s (or white space) on the left and/or right side of the composition.
   b. $R_O > R_{max}$ and $R_O - R_{max}$ is small. This is similar to a, but the solution is $R_{max}$ with content-item/s (or white space) on the top and/or bottom of the composition.

3. $R_O$ is far away from $[R_{min}, R_{max}]$, for example r1=r2=r3=1 and $R_O$=5. Then we have to reselect "$R_{tall}$" and/or "$R_{wide}$" and/or change the sequence of combinations that form the composition. Another possibility is to add additional items to the set of content-items or drop some items. This is the situation illustrated in FIG. 13a.

4. If none of the above achieves an acceptable solution, a new tree may be generated.

In summary, therefore, there are 3 main possibilities:
1. Desired aspect ratio is in the interval of croppability, so can be achieved exactly
2. Desired aspect ratio is not in the interval but close enough, so the misfit can be tolerated
3. Desired aspect ratio for the given composition within set croppability is not reachable: remake the composition.

The methods of adjusting the aspect-ratio discussed in relation to FIGS. 9 to 15 may be used to adjust a proposed layout provided by the method described in relation to FIGS. 3 to 8. In such embodiments the method of adjusting the aspect-ratio may be applied to one or more of the images used to make the final composition of images 615 in order that the aspect-ratio of the final composition of images 615 matches that of the first area 618.

An advantage of some of the embodiments discussed herein is that they provide a mechanism for reducing the search space in order that a finite search may be performed if it is desired to locate all solutions; i.e. the solutions to the search are finite rather than infinite. Thus, the time taken to find an acceptable solution to the layout of the content-items within the allocated area may well be reduced when the method is run on the same hardware when compared to prior art methods.

The invention claimed is:

1. A method of creating a document in a computer system, the document having an allocated area in which information is placed, the method comprising:
   i. providing a set of content-items for the document, each content-item containing information to be displayed by the computer system in the allocated area of the document, and each content-item having one or more sides;
   ii. selecting two of the content-items of the document to be combined with sides of common length in the computer system;
   iii. adjusting dimensions of at least one of the two selected content-items of the document in the computer system to provide the two selected content-items with the sides of common length, including adjusting a length of at least one of the sides of the at least one of the two selected content-items and resizing the information contained in the at least one of the two selected content-items, while keeping the aspect-ratio of the information contained in the at least one of the two selected content-items substantially constant;
   iv. combining in the computer system the two selected content-items of the document along the sides of common length to reduce the number of content-items in the set by one;

v. repeating steps ii., iii., and iv. in the computer system until one content-item remains that is a composition of the set of content-items for the document;

vi. placing the composition of the set of content-items for the document into the allocated area of the document; and vii. causing the computer system to activate a printing means to print the document.

2. The method according to claim 1 in which step iv of the method combines content-items by a side of common length.

3. The method according to claim 1 wherein the set of content-items is a sub-set of available content-items.

4. The method according to claim 1 further comprising repeating the combination of content-items in different sequences in the computer system to provide a plurality of possible solutions for the arrangement of the content items within the allocated area.

5. The method according to claim 1 wherein the two content-items are selected based on the aspect-ratios of the two content-items.

6. The method according to claim 1 wherein one or more content-items have an associated therewith an importance criterion, which is used to influence the size of one of the content-items in the composition relative to other content-items in the composition.

7. The method according to claim 1 further comprising cropping content-items within the composition in the computer system to adjust the aspect-ratio of the composition of content-items.

8. The method according to claim 7 wherein the dimensions of the cropped content-item are adjusted while maintaining a constant aspect-ratio of a portion of the cropped content-item.

9. The method according to claim 1 wherein one or more content-items have an area of interest that must be included in the composition and a peripheral area that is optionally included in the composition.

10. A document creation system arranged to create a document from a set of content-items containing displayable information for placement in an allocated area of the document, the system comprising:

a processor;

a memory storing program code to be executed by the processor, the program code comprising logic configured to:

select, from the set of content-items, two content-items to be combined with sides of common length;

adjust dimensions of at least one of the selected content-items to provide both content-items with the sides of common length, wherein a length of at least one side of the at least one of the selected content-items is adjusted and information contained in the at least one of the selected content-items is resized, wherein the aspect-ratio of the information is kept substantially constant;

combine the selected content-items along the sides of common length to form a new content-item and therefore reduce the number of content-items in the set by one;

check whether all content-items have been combined, and if not all of the set of content-items have been combined, repeat the selecting, the adjusting, and the combining for further content-items until one composition of all of the set of content-items remains; and place the one composition of all of the set of content-items into the allocated area of the document.

11. The system according to claim 10 further comprising logic configured to combine the content-items along a side of common length.

12. The system according to claim 10 wherein the system further comprises logic configured to repeat the combination of content-items in different sequences to provide a plurality of possible solutions.

13. The system according to claim 12 wherein the system further comprises logic configured to minimize the number of alignment lines, that can be created from the edges of content-items, within the composition.

14. A method of generating a visually assimilable document from a page and at least two content objects bounded by a perimeter in a computer system, the method comprising the steps of:

(i) selecting two content objects whose perimeters include a straight line in the computer system;

(ii) adjusting dimensions of at least one of the selected content objects in the computer system to provide the selected content objects with sides of common length, including adjusting a length of at least one side of the at least one of the selected content objects and resizing information contained in the at least one of the selected content objects, while keeping the aspect-ratio of the information substantially constant;

(iii) aggregating the two selected objects in the computer system by abutting their perimeters along the sides of common length;

(iv) repeating steps (i), (ii), and (iii) until a single, aggregated content object has been created in the computer system;

(v) locating the aggregated content object on the page in the computer system; and (vi) operating a printer with the computer system to print the aggregated content object.

15. A method according to claim 14 wherein the perimeter for each object is defined initially in accordance with a predetermined set of rules and is not visible on the printed page.

16. A method of generating a data file including a visually assimilable document in a computer system, the visually assimilable document created from: a template data item including a page upon which matter may be displayed; and at least one content data item including one or more content objects bounded by a perimeter, the method comprising the steps of:

(i) selecting, in the computer system, two content data items each including content objects bounded by perimeters including a straight line;

(ii) altering, in the computer system, one of the two selected content data items to scale the content object of the one of the two selected content data items and adjust the straight line of the perimeter bounding the content object to provide the two selected content data items with content objects bounded by perimeters having a straight line of common length along which they abut each other, wherein the aspect-ratio of the scaled content object of the one of the two selected content data items is kept substantially constant;

(iii) combining, in the computer system, the two selected content data items into a single data item including two aggregated content objects whose perimeters abut along the straight line of common length;

(iv) repeating, in the computer system, steps (i), (ii), and (iii) until a single, combined content data item including all the aggregated content objects has been created; and (v) inserting, in the computer system, the combined content data item into the template data item.

17. A method according to claim 16, further comprising the step of transmitting the combined content data item from the computer system to a printer and operating the printer to generate a document displaying the aggregated content objects on the page.

* * * * *